(12) United States Patent
Emori et al.

(10) Patent No.: US 6,882,468 B2
(45) Date of Patent: Apr. 19, 2005

(54) RAMAN AMPLIFIER

(75) Inventors: Yoshihiro Emori, Tokyo (JP); Shu Namiki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/663,829

(22) Filed: Sep. 17, 2003

(65) Prior Publication Data

US 2004/0051937 A1 Mar. 18, 2004

Related U.S. Application Data

(62) Division of application No. 09/950,779, filed on Sep. 13, 2001, now Pat. No. 6,825,972, which is a continuation of application No. PCT/JP01/00094, filed on Jan. 11, 2001.

(30) Foreign Application Priority Data

Jan. 14, 2000 (JP) ............................................ 2000-6567
Jun. 30, 2000 (JP) ....................................... 2000-199548

(51) Int. Cl.$^7$ ................................................ H01S 3/00
(52) U.S. Cl. .................................... 359/334; 359/341.3
(58) Field of Search .............................. 359/334, 341.3

(56) References Cited

U.S. PATENT DOCUMENTS

| 4,401,364 A | 8/1983 | Mochizuki |
| 4,616,898 A | 10/1986 | Hicks, Jr. |

(Continued)

FOREIGN PATENT DOCUMENTS

| EP | 0 139 081 | 5/1985 |
| EP | 0 933 894 | 8/1999 |
| JP | 10-73852 | 3/1998 |
| JP | 2001-7768 | 1/2001 |
| JP | 2001-33838 | 2/2001 |

OTHER PUBLICATIONS

Y. Emori, et al., Technical Research Report, The Institute of Electronics, Information and Communications Engineers, vol. 99, no. 52, pp. 25–29, "Hachou Taju Reiki Ld Unit Wo Mochita Raman Zoufukuki Ni Okeru Hachou Reyouiki 100nm Ni Wataru Ritoku Heitanka" (100nm Bandwidth Gain–Equalization on Raman Amplifiers Pumped by Multi–Channel WDM Laser Diodes), May 14, 1999 (with English Abstract).

(Continued)

*Primary Examiner*—Mark Hellner
(74) *Attorney, Agent, or Firm*—Oblon, Spivak, McClelland, Maier & Neustadt, P.C.

(57) ABSTRACT

In a Raman amplifier using three or more pumping wavelengths, when the pumping wavelengths are divided into a short wavelength side group and a long wavelength side group at the boundary of the pumping wavelength having the longest interval between the adjacent wavelengths, the short wavelength side group includes two or more pumping wavelengths having intervals therebetween which are substantially equidistant, and the long wavelength side group is constituted by two or less pumping wavelengths. When a certain pumping wavelength is defined as a first channel and pumping wavelengths which are spaced apart from each other by about 1 THz from the certain pumping wavelength toward a long wavelength side are defined as second to n-th channels, respectively, pump lights having wavelengths corresponding to the first to n-th channels are multiplexed, and pump light having a wavelength spaced apart from the n-th channel by 2 THz or more toward the long wavelength side is further multiplexed with the said multiplexed pump light, and resultant pump light is used as pump source. Pump lights of all of the wavelengths corresponding to the channels other than (n−1)th and (n−2)th channels are multiplexed with each other, and resultant pump light is used as pump source. Pump lights of all of the wavelengths corresponding to the channels other than (n−2)th and (n−3)th channels are multiplexed with each other, and resultant pump light is used as pump source.

6 Claims, 31 Drawing Sheets

U.S. PATENT DOCUMENTS

| | | |
|---|---|---|
| 4,699,452 A | 10/1987 | Mollenauer et al. |
| 4,805,977 A | 2/1989 | Tamura et al. |
| 4,881,790 A | 11/1989 | Mollenauer |
| 5,673,280 A | 9/1997 | Grubb et al. |
| 5,883,736 A | 3/1999 | Oshima et al. |
| 5,887,093 A | 3/1999 | Hansen et al. |
| 5,946,428 A | 8/1999 | Aleksandrov et al. |
| 5,959,750 A | 9/1999 | Eskildsen et al. |
| 5,966,206 A | 10/1999 | Jander |
| 5,966,480 A | 10/1999 | LeGrange et al. |
| 6,038,356 A | 3/2000 | Kerfoot, III et al. |
| 6,052,219 A | 4/2000 | Kidorf et al. |
| 6,081,323 A | 6/2000 | Mahgerefteh et al. |
| 6,081,366 A | 6/2000 | Kidorf et al. |
| 6,115,174 A | 9/2000 | Grubb et al. |
| 6,147,794 A * | 11/2000 | Stentz ................. 359/334 |
| 6,163,636 A * | 12/2000 | Stentz et al. ............. 385/24 |
| 6,178,038 B1 | 1/2001 | Taylor et al. |
| 6,181,464 B1 | 1/2001 | Kidorf et al. |
| 6,191,877 B1 | 2/2001 | Chraplyvy et al. |
| 6,212,310 B1 | 4/2001 | Waarts et al. |
| 6,263,139 B1 | 7/2001 | Kawakami et al. |
| 6,266,180 B1 | 7/2001 | Inagaki et al. |
| 6,282,002 B1 | 8/2001 | Grubb et al. |
| 6,320,695 B1 | 11/2001 | Tanaka et al. |
| 6,320,884 B1 * | 11/2001 | Kerfoot et al. ............. 372/3 |
| 6,344,922 B1 * | 2/2002 | Grubb et al. ............ 359/334 |
| 6,377,389 B1 * | 4/2002 | Grubb et al. ............ 359/334 |

OTHER PUBLICATIONS

Sugizaki et al. (OFC/IOOC '99 Tech. Digest. Feb. 21–26, 1999).

Emori et al. (OFC/IOOC '99 Tech. Digest. Feb. 21–26, 1999).

* cited by examiner

RAMAN AMPLIFIER

BACKGROUND OF THE INVENTION

1. Field of the Invention

The present invention generally relates to an optical amplifier, and, more particularly, it relates to a Raman amplifier.

2. Description of the Related Art

In wavelength division multiplexed (WDM) systems used in current optical communication systems, as methods for increasing transmission capacity, there are a method for expanding a signal wavelength band to increase the number of multiplexed wavelengths, and a method for enhancing a transmission rate (bit rate) per wavelength. In normal WDM systems, due to limitation in gain wavelength band of an Erbium doped fiber amplifier (EDFA), most generally, a wavelength for optical signal is selected from a wavelength band (called as a C-band) of about 1530 to 1565 nm. On the other hand, since optical amplification can be effected by the EDFA also in a wavelength band (called as an L-band) of about 1575 to 1610 nm, recently, WDM systems regarding this band has been developed.

By expanding the wavelength band as mentioned above, capacity which can be transmitted by a single WDM system can be increased. Regarding the WDM systems, since a C-band WDM system has firstly been developed, in order to increase the transmission capacity of the WDM system, it is desirable that the existing equipment for the C-band WDM system is utilized and an L-band WDM system is added to the equipment to gradually increase the capacity. In the conventional WDM systems using the EDFA, the transmission rate per wavelength has been enhanced (speeded up) by technically improving various elements constituting a transmission system. However, in systems utilizing a discrete amplifier such as EDFA, achievement of higher speed has been approaching to its limit. In order to achieve further high speed and/or longer distance transmission, it is said that incorporation of a distributed amplifier such as a Raman amplifier into the system is inevitable, and, to this end, various developments have been made vigorously to permit practical use.

As shown in FIG. 20, the Raman amplifier comprises an optical fiber as an amplifying medium, and a pump source for generating stimulated Raman scattering in the fiber. When silica-based optical fiber is used as the amplifying medium, peak of gain is generated at a longer wavelength side than a wavelength of the pump light, i.e., in a frequency band smaller than that of the pump light by about 13.2 THz. For example, since a difference in wavelength between 1450 nm and 1550 nm corresponds to 13.2 THz, a pump light having a wavelength of about 1450 nm is used in order to amplify the C-band, and a pump light having a wavelength of about 1490 nm is used in order to amplify the L-band (FIG. 21).

However, single wavelength pumped Raman gain has great wavelength dependency, and as apparent from FIG. 22, from when the Raman gain exceeds about 5 dB, it is impossible to suppress gain deviation below 1 dB regarding an operating band width of 30 nm. In order to solve this problem, it is effective that a plurality of pump lights having proper wavelength interval are applied to the Raman amplifier (i.e., the amplifier is pumped by a multi-wavelength pump source). According to this method, Raman amplification having better gain flatness can be achieved in a wider band than the conventional band. As disclosed in Japanese Patent Publication No. 7-99787 (1995) (particularly, in FIG. 4 thereof), such concept itself can be understood intuitively. Japanese Patent Application Nos. 10-208450 (1998) and 11-34833 (1999) refer concrete values of the wavelength interval and assert that the proper value is 6 nm to 35 nm.

FIGS. 23A and 23B show examples of Raman gain profiles obtained when the pump light intervals are selected to 4.5 THz and 5 THz, respectively and DSF is used as an amplifying fiber. As apparent from FIGS. 23A and 23B, when the pump light interval is increased, a valley of gain is deepened and gain deviation is increased. In FIG. 23A, values shown in the following Table 1 were used as frequency (wavelength) of the pump light and, in FIG. 23B, values shown in the following Table 2 were used as frequency (wavelength) of the pump light. In this case, the pump light interval of 4.5 THz corresponds to 33 nm and the pump light interval of 5 THz corresponds to 36.6 nm. That is to say, these examples show the fact that the gain flatness is not so good if the pump light interval becomes more than 35 nm.

TABLE 1

| Pumping frequency THz | Pumping wavelength nm | Wavelength interval nm |
|---|---|---|
| 204.5 | 1466.0 | 33.0 |
| 200.0 | 1499.0 | |

TABLE 2

| Pumping frequency THz | Pumping wavelength nm | Wavelength interval nm |
|---|---|---|
| 205.0 | 1462.4 | 36.6 |
| 200.0 | 1499.0 | |

FIG. 24 shows a gain profile obtained when the pump light interval is selected to 4.5 THz and three wavelengths are used. From FIG. 24, it can be seen that, when the third pumping wavelength is added, the valley of gain is deepened in case of the pump light interval of 4.5 THz. FIG. 25 shows a gain profile obtained when the pump light intervals are selected to 2.5 THz and 4.5 THz, respectively and three wavelengths are used. In comparison with FIG. 24, the valley of gain becomes shallower. Since the frequency interval of 2.5 THz used here corresponds to the wavelength interval of about 18 nm, also in this case, the wavelength interval is included in the range from 6 nm to 35 nm. However, considering conversely, it can be said that, even when the wavelength interval is included in the range, if the wavelength interval is not set properly, flat gain cannot be obtained.

By the way, in designing the conventional WDM optical amplifiers, the object was to reduce the gain flatness as small as possible, and an optical amplifier in which all of optical signals are subjected to the same gain was ideal. When the number, power and band width of the used signals are small, such design concept is adequate. However, as the used band of the optical signal is increased, there arose a problem regarding Raman amplifying effect between optical signals. As disclosed in journal (for example, S. Bigo et al, "IEEE Photonics Technology Letters", pp. 671–673, 1999), in this phenomenon, WDM signals which were set to have same powers upon incident on a transmission line tend to include linear tilt in which power becomes small at a short wavelength side and great as a long wavelength side after transmission. Such tilt is determined by various factors such as the number, power and band width of the optical signals, property of a fiber constituting the transmission line and a transmission distance. As means for coping with this problem, there has been proposed an tilt compensator (T. Naito OAA'99, WC5) for attenuating the long wavelength side signal by using a loss medium having wavelength dependency and a method (M. Takeda et al, OAA'99, ThA3) for compensating tilt by give relatively great gain to the short wavelength side signal by using wavelength dependency of Raman gain. Since the former method for giving the loss has disadvantage due to noise, the later method is more excellent. However, in the paper written by Takeda et al, since the tilt of Raman gain is not linear, the gain flatness after compensating the tilt is relatively great (more than 1 dB).

Similar to the WDM system using only the above-mentioned EDFA, also in the WDM system using the Raman amplifier, when the WDM system for C-band is introduced, it is desirable that the system is designed so that the WDM system for L-band can be added while maintaining the function of the equipment.

In a Raman amplifiers using wavelength multiplexed pumping, when it is desired to expand the gain band, like band extension from C band to C+L band, it is necessary that, while utilizing all of pumping wavelengths which were used before expansion, after the expansion, the amplifier can be operated for the C+L band. That is to say, it must be designed so that, by adding new pumping wavelength to the pumping wavelength used for the C-band, the amplifier can be operated for the C+L band. In this case, it is necessary that wavelength arrangement for flattening the gain in the C-band and the C+L band can be commonly used.

Since the gain deviation is proportional to the magnitude of the peak gain, if the gain is great, the pump light interval must be set small. Further, as mentioned above, in a case where the pump lights are equidistantly arranged, even when the wavelength interval is smaller than 35 nm, the gain deviation may not be reduced sufficiently. Also in this case, it is necessary to use narrower wavelength interval. Although the gain deviation can be reduced by reducing the pump light interval in principle, due to problems regarding a wave combining technique and cost, practically, the pump light interval has a lower limit. In Japanese Patent Application Nos. 10-208450 (1998) and 11-34833 (1999), the lower limit is determined to 6 nm on the basis of the wave combining technique.

However, in the above-mentioned Japanese Patent Application Nos. 10-208450 (1998) and 11-34833 (1999), although the fact that the interval between two adjacent pumping wavelengths is preferably within a range from 6 nm to 35 nm is disclosed, adequate information regarding detailed design values is not disclosed. Further, in the design described in a published paper (Y. Emori et al, OFC'99 PD19), the gain deviation is 1 dB, and this technique cannot be applied when smaller gain flatness is required.

SUMMARY OF THE INVENTION

In the present invention, a method for selecting wavelength disposition in a Raman amplifier using three or more pumping wavelengths is disclosed, and a primary object of the present invention is to provide a Raman amplifier having good gain flatness, and further, an object of the present invention is to provide a Raman amplifier in which gain deviation becomes about 0.1 dB for a peak value of Raman gain of 10 dB.

Further, another object of the present invention is to provide a Raman amplifier suitable for compensating Raman effect between signals which arises a problem during wide band WDM transmission.

In the present invention, it is also considered to provide a Raman amplifier in which, when a gain band is expanded by adding new pump light, gain and gain flatness after expansion are not deteriorated considerably in comparison with before expansion.

The Inventors investigated the gain profiles of Raman amplifiers utilizing wavelength multiplexed pumping and analyzed wavelength disposition for flattening the gain. The principle is as follows.

The gain profile of the Raman amplifier utilizing wavelength multiplexed pumping is obtained by the superposition of gains generated by respective pumping wavelengths. Accordingly, a combination of gain tilts which are cancelled with each other is one of factors for obtaining flat gain. That is to say, a gain property having good wavelength flatness can be obtained by combining a rightwardly and downwardly extending curve (negative gain tilt) in which the gain is decreased from the short wavelength side toward the long wavelength side and a rightwardly and upwardly extending curve (positive gain tilt) in which the gain is increased from the short wavelength side toward the long wavelength side. When the number of pumping wavelengths is two, the tilt at a longer wavelength side from gain peak of a gain curve obtained by the shorter wavelength pump is combined with the tilt at a shorter wavelength side from gain peak of a gain curve obtained by the longer wavelength pump. As apparent from FIG. 21, the Raman gain curve of one wavelength pumping which is a basic element for superposition has two gain peaks rather than one, and, in the C-band, the first peak at the end of positive gain tilt located at 1550 nm and the second peak at the end of negative gain tilt is located at 1560 nm. Further, in the L-band, the first peak at the end of positive gain tilt is located at 1595 nm and the second peak at the end of negative gain tilt is located at 1605 nm. Thus, in any cases, two pumping wavelenghts must be spaced apart from each other by 10 nm or more. In the curve A shown FIG. 21, the center wavelength of the pumping wavelength is 1450 nm, and, in the curve B, the center wavelength of the pumping wavelenght is 1490 nm.

FIG. 26 shows an example of the gain profile of the Raman amplifier designed for the C-band and the following Table 3 shows pumping wavelengths used therefor. A supposed fiber is a normal single mode fiber, and the gain band is designed to cover 1530 nm to 1565 nm. The gain profile of the Raman amplifier utilizing the wavelength multiplexed pumping is obtained by the superposition of gains generated by respective pumping wavelengths. In FIG. 26 the allocation of gain magnitude caused by each pump wavelength is optimized to minimize the flatness of the gain obtained by addition. The number of pumping wavelengths is appropriately selected in accordance with the desired gain flatness. Similarly, FIG. 27 shows an example of the gain profile of the Raman amplifier designed for the L-band and the following Table 4 shows pumping wavelengths used therefor.

TABLE 3

| 2 wavelength pumping | 3 wavelength pumping | 4 wavelength pumping |
|---|---|---|
| 1426 | 1424 | 1423 |
| 1453 | 1435 | 1430 |

TABLE 3-continued

| 2 wavelength pumping | 3 wavelength pumping | 4 wavelength pumping |
|---|---|---|
| (Unit: nm) | 1460 | 1438 |
|  |  | 1462 |

TABLE 4

| 2 wavelength pumping | 3 wavelength pumping | 4 wavelength pumping |
|---|---|---|
| 1464 | 1463 | 1462 |
| 1493 | 1475 | 1470 |
|  | 1500 | 1478 |
| (Unit: nm) |  | 1501 |

When the number of pumping wavelengths is two, the gain band width can be widened by increasing the interval between the wavelengths. However, if the interval is too wide, the valley of gain will be created in the band. Accordingly, the gain flatness and the gain band have a relationship of "trade-off." In FIGS. 26 and 27, the wavelength intervals of pump lights are determined to obtain the optimized results in pre-determined gain bands, and such intervals are 27 nm and 29 nm, respectively (refer to the Tables 3 and 4).

In the Raman gain curve of one wavelength pumping which is a basic element for superposition, as shown in FIG. 21, the gain tilt at the longer wavelength side from the gain peak is more steep than the gain tilt at the shorter wavelength, and the band in which the tilt can be utilized is narrow. In order to widen the band by using a more gentle negative gain tilt, the negative gain tilt must be formed by using a plurality of pumping wavelengths.

When the gain curve having the negative gain tilt is formed by using three or more pumping wavelengths, similar to two pumping wavelengths, the pumping wavelengths for forming the negative gain tilt must be spaced apart from the pumping wavelengths for forming the positive gain tilt by 10 nm or more. However, since the pump light for forming the negative gain tilt is constituted by the plurality of wavelengths, the longest pumping wavelength among them is spaced apart from the pumping wavelength for forming the positive gain tilt by 10 nm or more. This corresponds to the interval between 1435 nm and 1460 nm in three (3) wavelengths pumping and the interval between 1438 nm and 1462 nm in four (4) wavelengths pumping in the Table 3. Further, this corresponds to the interval between 1475 nm and 1500 nm in three (3) wavelengths pumping and the interval between 1478 nm and 1501 nm in four (4) wavelengths pumping in the Table 4.

In a case where three or more pumping wavelengths are used, when the intervals between the pumping wavelengths is approximately equidistant, ripple in the negative gain tilt generated by the combination becomes small. When the flatness is obtained by combination with the positive gain tilt, such ripple determines the final gain flatness. It is demonstrated by the four wavelength pumping case in FIG. 26 and FIG. 27. As shown in the Tables 3 and 4, the optimized wavelengths are 1423 nm, 1430 nm, 1438 nm and 1462 nm, 1470 nm, 1478 nm, which provide approximately equidistant disposition.

FIGS. 28 to 30 show the performance of the Raman gain curves when the pump light intervals are equidistant. FIG. 28 shows an example that the peak gain is adjusted to 10 dB under a condition that the gains generated by each pump lights are the same. From FIG. 28, it can be seen that the narrower the pump light interval is, the smaller the unevenness of the gain is. FIG. 29 shows an example that the gains obtained by the respective pump lights are adjusted to flatten the gain. Also in this case, similar to FIG. 28, the narrower the pump light interval is, the smaller the unevenness of the gain is. Further, it can be seen that undulation of the gain curve in FIG. 28 determines the maximum gain deviation in FIG. 29. Thus, in order to bring the gain deviation to about 0.1 dB, the pump light interval of 2 THz is too wide, but 1 THz is adequate.

FIG. 30 shows the pattern when the multiplexed amount in number is changed while maintaining the pump light interval in 1 THz. As can be seen from a gain curve of 1ch pumping, in case of a silica-based fiber, a smooth curve having no unevenness is obtained at the shorter wavelength side from the gain peak, however, there are three relatively prominent unevenness at the longer wavelength side, which is a factor for determining the limitation of the flatness. The unevenness is decreased as the multiplexed amount in number is increased. For example, referring to the gain curve of 1ch, although this curve has protrusion of about 1 dB in the vicinity of 187 THz, as the multiplexed amount in number is increased, such protrusion gradually becomes smaller. The reason is that, since the peak gains are set to be the same, as the multiplexed amount in number is increased, the gain per one wave is decreased to reduce the magnitude of the protrusion itself and the unevenness of the same shape (concavities and convexities) are added with slight equidistant intervals. That is to say, the convexities of the gain curve of a certain pumping wavelength are added to the concavities of the gain curve of another pumping wavelength to reduce the entire unevenness. The value "about 1 THz" specified in claims 2 to 4 is based on this principle and is also based on the fact that frequency difference between the protrusion in the vicinity of 187 THz and the immediately adjacent recess in the vicinity of 188 THz is about 1 THz in the gain curve of 1ch pumping shown in FIG. 30. Accordingly, depending upon the fiber used, the gain curve of 1ch pumping may be slightly changed and, thus, the value specified in claims 2 to 4 as "about 1 THz" may also be changed. In any case, in order to reduce the gain deviation, the unevenness of the gain curves to be added to each other must be cancelled with each other.

Since the limit of the gain deviation is determined by the undulation and unevenness of the each gain curves to be overlapped or combined, it is considered that a flat gain profile having small gain deviation can be obtained by combining the gain curves having small unevenness. Accordingly, this can be achieved by combining the gain curve generated by the pump light multiplexed with interval of about 1 THz with the gain curve generated by the pump light located at the longer wavelength side than the former pump light. In this case, in view of expansion of the band, it is desirable that the peaks of two gain curves are spaced apart from each other moderately.

While the effects as mentioned above was explained for the purpose of reducing the gain flatness, by reducing the gain of the pump light at the long wavelength side, a gain profile in which gain is linearly reduced from the short wavelength side toward the long wavelength side can be achieved. When this is combined with the tilt of optical signal level created by the Raman effect between the optical signals, the level of the optical signal can be flattened. Since any tilt can be realized by adjusting the distribution of gain between the short wavelength side and the long wavelength side, any Raman tilt can be compensated for.

When the gain bands of the C-band and L-band are tried to be expanded, it is considered that simultaneous use of the pumping wavelength for C-band and the pumping wavelength for L-band is optimum.

However, when both the pump lights for C-band and L-band shown in FIGS. 26 and 27 are simultaneously used, gain profiles such as shown in FIG. 31 are obtained even if the gain allocation is optimized so as to be flatten. The following Table 5 pumping wavelengths used in this case. In this case, if the gain flatness is tried to be equal to those shown in FIGS. 26 and 27 in the entire area of C+L as shown in FIG. 31, a big recess is generated in the C-band, thereby more worsening the gain flatness than before expansion.

TABLE 5

| 2 wave for C-band + 2 wave for L-band | 3 wave for C-band + 3 wave for L-band | 4 wave for C-band + 4 wave for L-band |
|---|---|---|
| 1426 | 1424 | 1423 |
| 1453 | 1435 | 1430 |
| 1464 | 1460 | 1438 |
| 1493 | 1463 | 1462 |
|  | 1475 | 1470 |
|  | 1500 | 1478 |
| (Unit: nm) |  | 1501 |

For the same reasons as mentioned above, also when the operation of good gain flatness is effected in the C+L band, it is necessary that the negative gain tilt is formed by using the plurality of equidistant pumping wavelenghts and the positive gain tilt is formed by using the pump light located at the longer wavelenght side from the longest pumping wavelength by 10 nm or more. However, since the pumping wavelengths used in FIG. 31 are obtained only by simultaneously using the pumping wavelengths of FIGS. 26 and 27, the requirement "approximately equidistant disposition" cannot be satisfied in the pumping wavelength band for C-band. The Table 5 shows the pumping approximately used in FIG. 31. According to this, in order to obtain the approximately equidistant disposition at the short wavelength side, it can be seen that the pumping wavelength is insufficient in the pumping wavelength band for C-band. It was found that such insufficient amount becomes a factor for generating the recess in gain shown in FIG. 31.

From the above results, it was analyzed that means required for achieving the above object are as follows.

According to a means of the present invention, in a Raman amplifier using three or more pumping wavelengths, when the pumping wavelengths are divided into a short wavelength side group and a long wavelength side group at the boundary of the pumping wavelength having the longest interval between the adjacent wavelengths, the short wavelength side group includes two or more pumping wavelengths having intervals therebetween which are substantially equidistant, and the long wavelength side group is constituted by two or less pumping wavelengths.

According to another means of the present invention, when a shortest pumping wavelength is defined as a first channel and pumping wavelengths which are spaced apart from each other by about 1 THz from the shortest pumping wavelength toward a long wavelength side are defined as second to n-th channels, respectively, pump lights having wavelengths corresponding to the first to n-th channels are multiplexed, and pump light having a wavelength spaced apart from the n-th channel by 2 THz or more toward the long wavelength side is further combined, and resultant pump light is used as pump light for a Raman amplifier.

Further, when the shortest pumping wavelength is defined as the first channel and pumping wavelengths which are spaced apart from each other by about 1 THz from the shortest pumping wavelength toward the long wavelength side are defined as the second to n-th channels, respectively, all of the wavelengths corresponding to the channels other than (n−1)th and (n−2)th channels are combined with each other, resultant pump light is used for the Raman amplifier. Alternatively, all of the wavelengths corresponding to the channels other than (n−2)th and (n−3)th channels are combined with each other, resultant pump light is used for the Raman amplifier.

According to still another means of the present invention, in a Raman amplifier for expanding a gain wavelength band, there are provided two or more pumping wavelengths before expansion, and two or more pumping wavelengths are added for expanding the gain wavelength band, at least one of the pumping wavelengths to be added is differentiated from the pumping wavelengths used before expansion, and at least one of the differentiated pumping wavelengths is positioned within the pumping wavelengths bands used before expansion.

According to still another means of the present invention, in a Raman amplifier for expanding a gain wavelength band, there are provided two or more pumping wavelengths before expansion, and two or more pumping wavelengths are added for expanding the gain wavelength band, at least one of the pumping wavelengths to be added is differentiated from the pumping wavelengths used before expansion, and at least one of the differentiated pumping wavelengths is positioned within a pumping wavelength band having insufficient gain among the pumping wavelengths bands used before expansion.

According to still another means of the present invention, in a Raman amplifier for expanding a gain wavelength band, there are provided two or more pumping wavelengths before expansion, and one or more pumping wavelength is added to the pumping wavelengths bands before expansion so that, by the addition, the pumping wavelengths within the pumping wavelengths bands before expansion are spaced apart from each other equidistantly or substantially equidistantly.

According to a Raman amplifier of the present invention, when a C-band and an L-band are simultaneously amplified by simultaneously using two or more pumping wavelengths for amplifying the C-band and two or more pumping wavelengths for amplifying the L-band, one or more pumping wavelength different from the pumping wavelengths for the C-band used before expansion is added to bands of the pumping wavelengths for the C-band.

According to another Raman amplifier of the present invention, when a C-band and an L-band are simultaneously amplified by simultaneously using two or more pumping wavelengths for amplifying the C-band and two or more pumping wavelengths for amplifying the L-band, one or more pumping wavelength different from the pumping wavelengths for the C-band used before expansion is added to a band of a wavelength having insufficient gain among bands of the pumping wavelengths for the C-band.

According to still another Raman amplifier of the present invention, when a C-band and an L-band are simultaneously amplified by simultaneously using two or more pumping wavelengths for amplifying the C-band and two or more pumping wavelengths for amplifying the L-band, one or more pumping wavelength different from the pumping wavelengths for the C-band used before expansion is added to bands of the pumping wavelengths for the C-band so that, by the addition, the pumping wavelengths within the bands of the pumping wavelengths before expansion are spaced apart from each other equidistantly or substantially equidistantly.

BEST MODES FOR CARRYING OUT THE PRESENT INVENTION

In embodiments described hereinbelow, examples that a first channel is 211 THz are shown. The reason is that a wavelength band greater than 1530 nm (corresponding to frequency smaller than about 196 THz) which has been used in present WDM systems is supposed as an amplifying band. Accordingly, if a so-called L-band greater than 1580 nm (corresponding to frequency smaller than about 190 THz) is supposed as the amplifying band, since a pumping band may be shifted by 6 THz, a first channel may be 205 THz. Regarding the other amplifying bands, the first channel can be determined in a similar manner.

Figure 1:
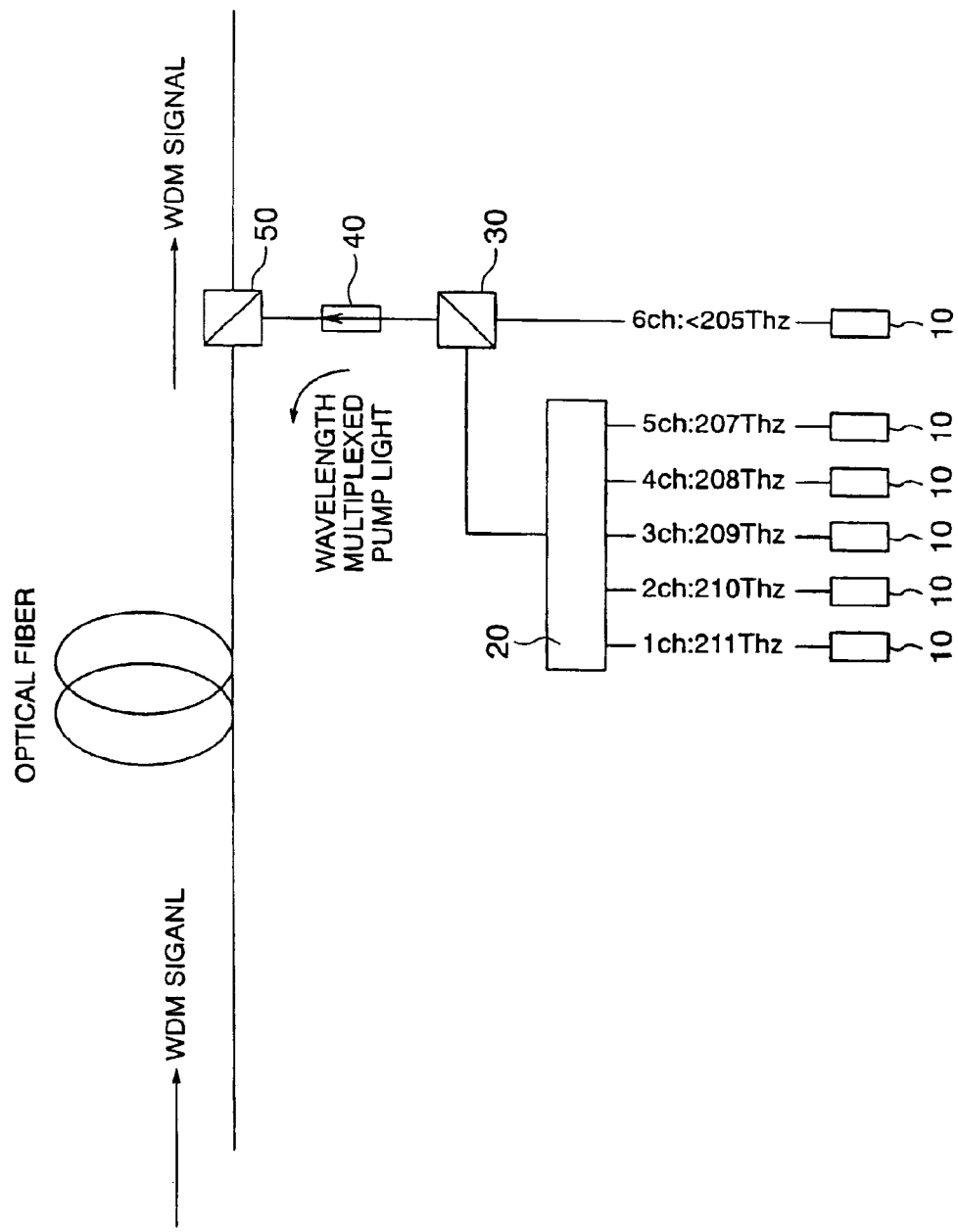
FIG. 1 is an explanatory view showing a Raman amplifier according to a first embodiment of the present invention.

FIG. 1 shows a first embodiment of the present invention which corresponds to claim 2. Frequency of the first channel is 211 THz (corresponding to a wavelength of 1420.8 nm), and frequencies of second to fifth channels are equidistantly distributed between 210 THz (corresponding to a wavelength of 1427.6 nm) and 207 THz (corresponding to a wavelength of 1448.3 nm) with interval of 1 THz. A wavelength multiplexed pump source for a Raman amplification is obtained by combining pump light (frequency of 205 THz, wavelength of 1462.4 nm) having a wavelength spaced apart from the fifth channel by 2 THz toward a long wavelength side with the above-mentioned channels. For each of pump sources 10 of respective wavelengths shown in FIG. 1, pumping power obtained by combining outputs of semiconductor lasers of Fabry-Perot type wavelength-stabilized by fiber Bragg grating (FBG) by means of a polarization beam coupler (PBC). Polarization beam coupling is an action for increasing pump power of the each wavelength and at the same time for reducing polarization dependence of Raman gain. If the pump power outputted from the single laser is sufficient, after the laser output was depolarized, it may be connected to a wavelength multiplexer. A multiplexer 20 of Mach-Zehnder interferometer type shown in FIG. 1 serves to multiplex or combine pump lights of a plurality of wavelength having adjacent wavelengths with constant frequency interval. A dielectric filter 30 shown in FIG. 1 serves to combine two relatively wide wavelength bands and can combine a wavelength greater than a certain wavelength with a wavelength smaller than the certain wavelength. In the illustrated embodiment, a filter 30 capable of combining frequency higher than 207 THz (wavelength shorter than 1448.3 nm) with frequency lower than 205 THz (wavelength longer than 1462.4 nm) is used. In FIG. 1, the pump light combined by the dielectric filter 30 is sent to a dielectric filter 50 through an isolator 40 to amplify a WDM signal in an optical fiber.

Figure 2:
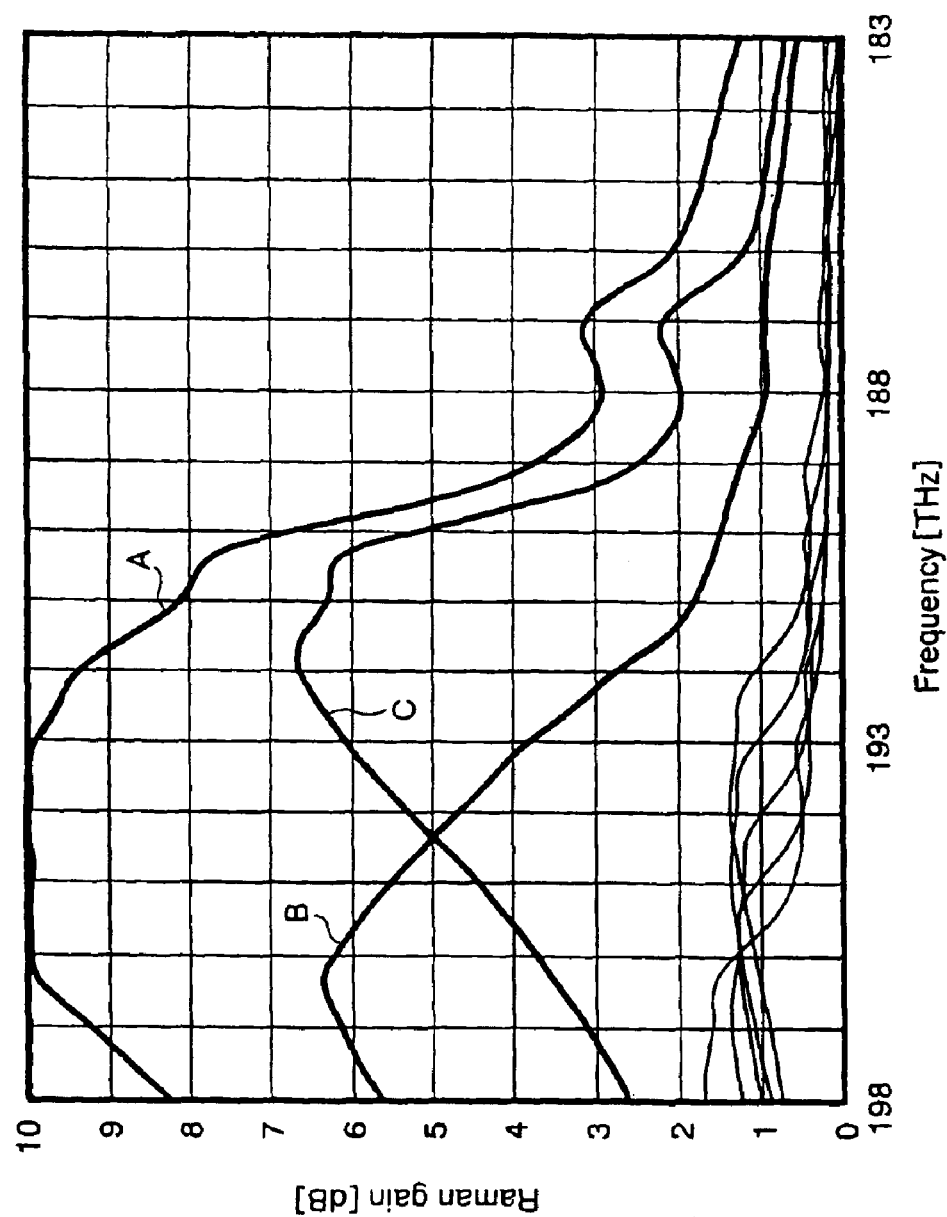
FIG. 2 is a view showing Raman gain profiles obtained when a pump source shown in FIG. 1 is used.
Figure 3:
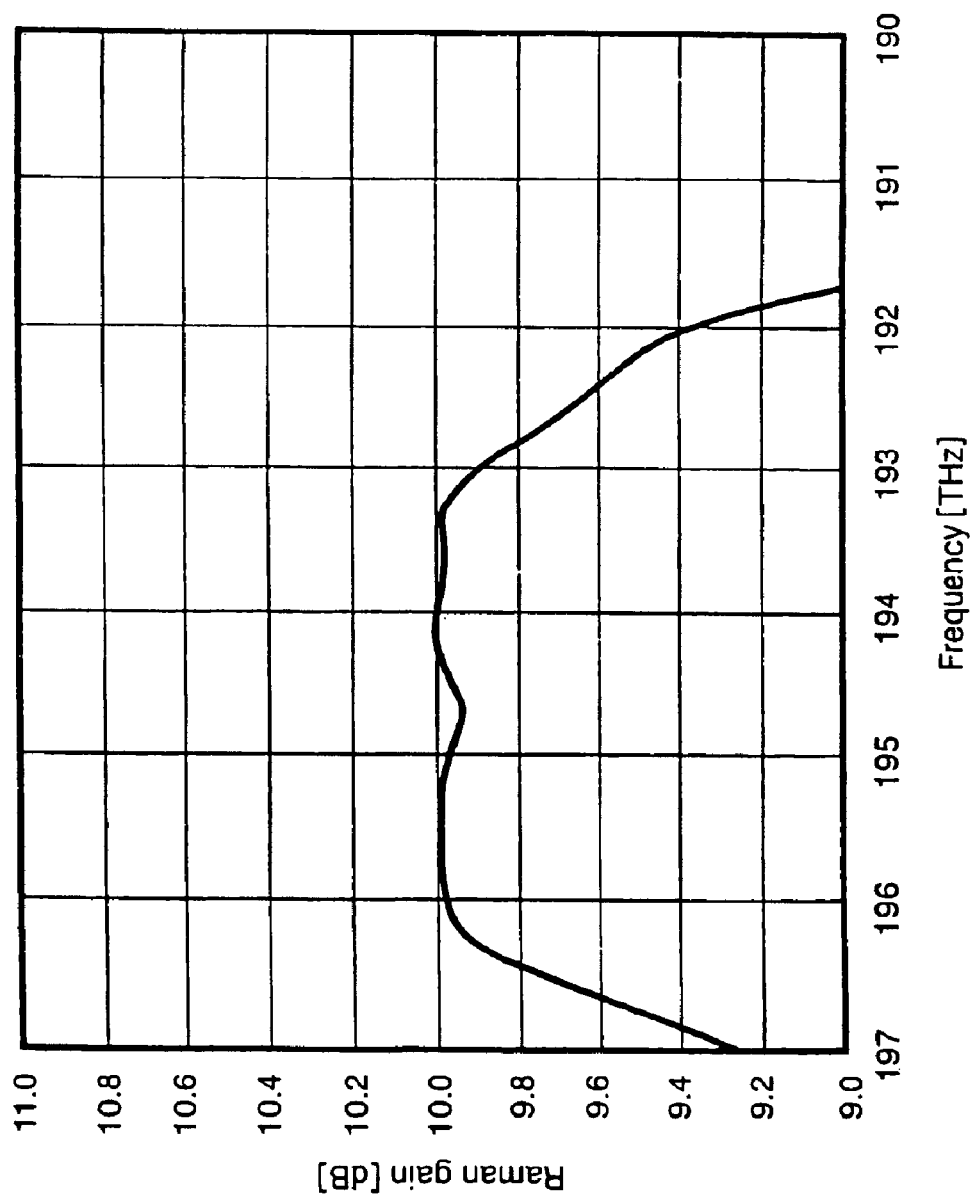
FIG. 3 is an enlarged view showing a total gain shown in FIG. 2.

FIG. 2 shows Raman gain profiles obtained when the pump light sources shown in FIG. 1 are used. A curve A represents total gain, a curve B represents a sum of gains obtained by the pump lights of the first to fifth channels, a curve C represents gain of the sixth channel, and fine line curves represent gains obtained by the pumping wavelengths of the first to fifth channels. As will be described later regarding effects, by multiplexing the pump lights at the short wavelength side with interval of 1 THz, a flat curve with negative gain tilt can be formed, and, by adding a positive gain tilt obtained from the pump lights at the long wavelength side to this negative gain tilt, the total Raman gain is flattened. From FIG. 2, it can be seen that unevenness in the plural gain curves is well cancelled by useing the interval of 1 THz. FIG. 3 is an enlarged view of the total gain. A property in which peak gain is 10 dB and a gain band is about 196 THz (wavelength: 1529.6 nm) to 193 THz (wavelength: 1553.3 nm) and gain deviation is about 0.1 dB can be realized.

Figure 4:
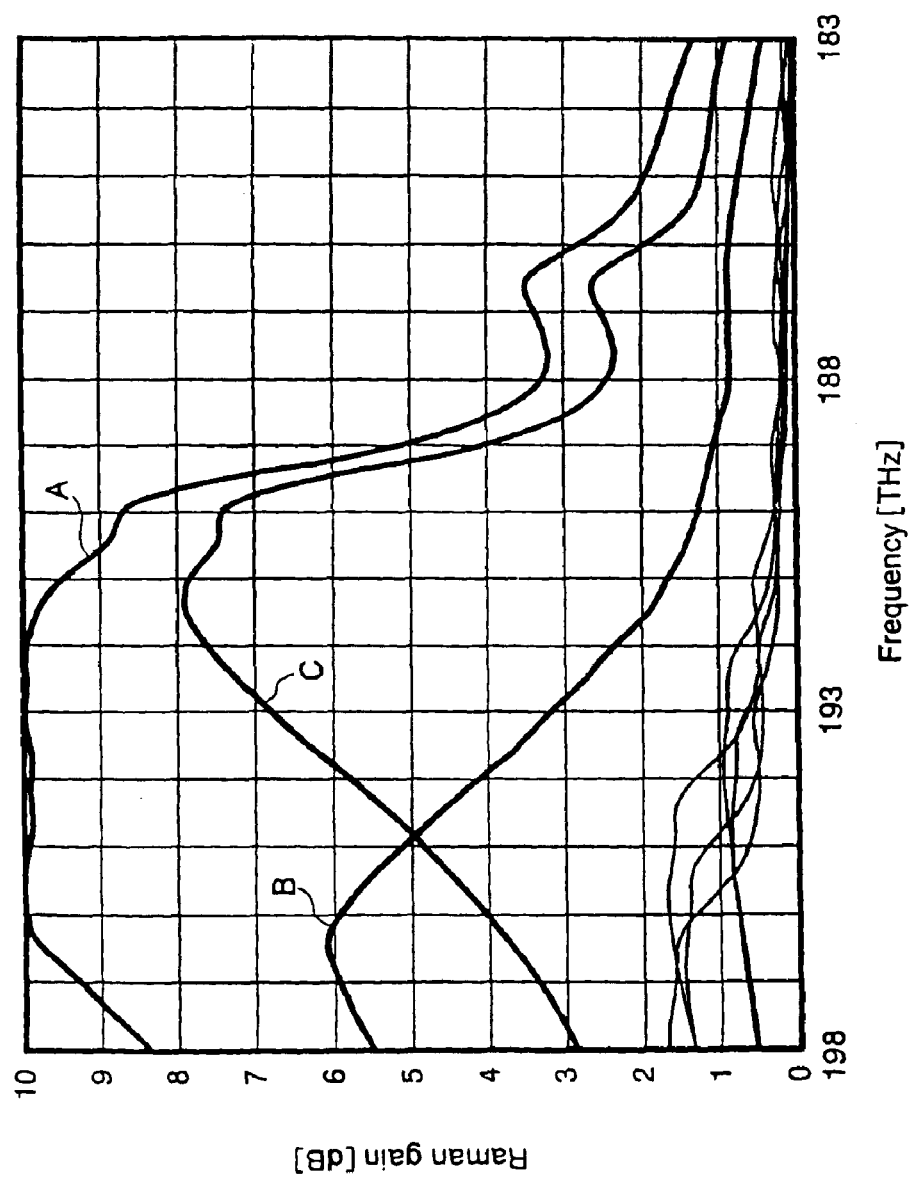
FIG. 4 is a view showing Raman gain profiles obtained when a wavelength of a sixth channel is spaced apart from a fifth channel by 2.5 THz toward a long wavelength side, in the Raman amplifier shown in FIG. 1.
Figure 5:
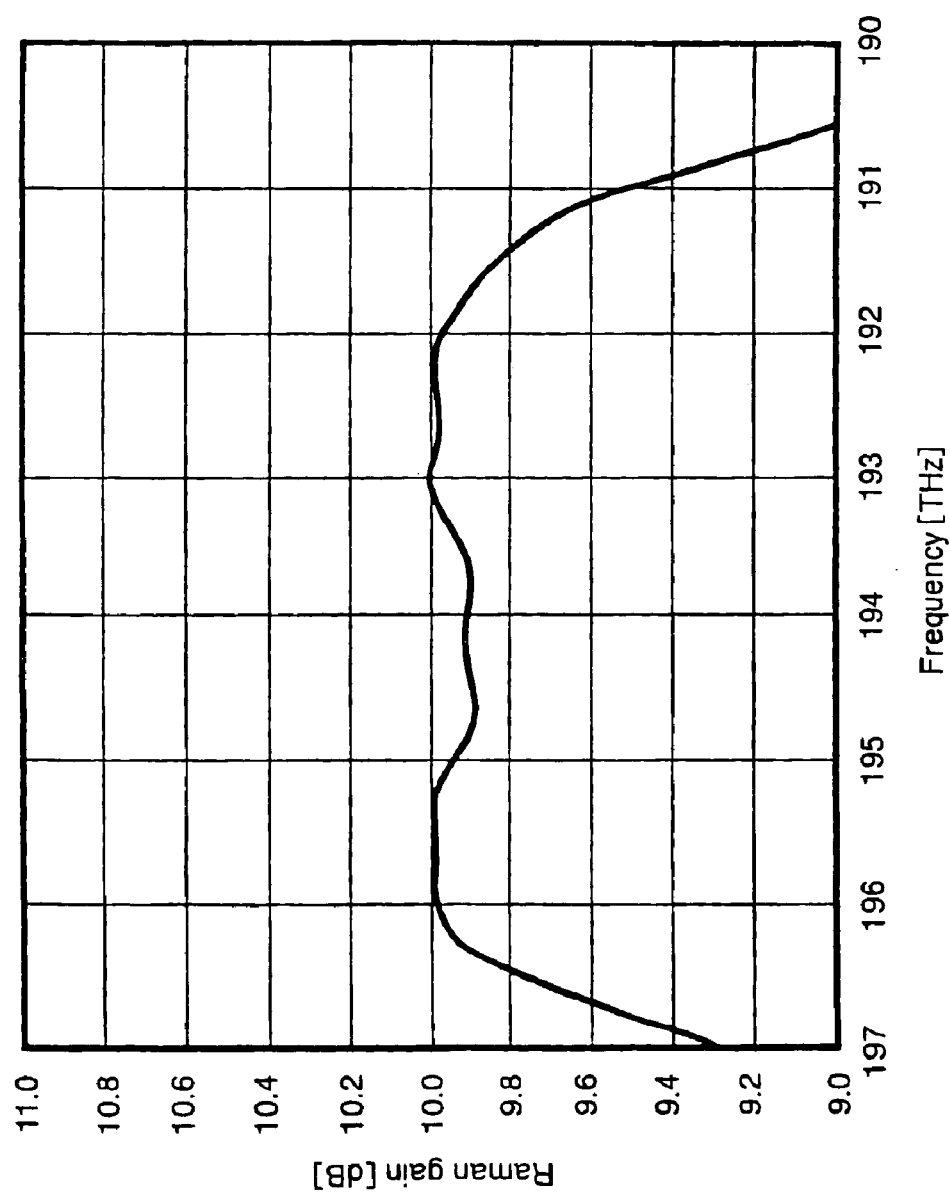
FIG. 5 is an enlarged view showing a total gain shown in FIG. 4.

FIG. 4 shows gain profiles obtained when the wavelength of the sixth channel is a wavelength (frequency: 204.5 THz, wavelength: 1465.5 nm) spaced apart from the fifth channel by 2.5 THz toward the long wavelength side in FIG. 1. Similar to FIG. 2, a curve A represents total gain, a curve B represents a sum of gains obtained by the pump lights of the first to fifth channels, a curve C represents gain of the sixth channel, and fine line curves represent gains obtained by the pumping wavelengths of the first to fifth channels. Also in this case, the total Raman gain is flattened by adding a negative gain tilt obtained from the pump lights at the short wavelength side to a positive gain tilt obtained from the pump lights at the long wavelength side. FIG. 5 is an enlarged view of the total gain. A property in which peak gain is 10 dB and a gain band is about 196 THz (wavelength: 1529.6 nm) to 192 THz (wavelength: 1561.4 nm) and gain deviation is about 0.1 dB can be realized. A gain band is wider than that in FIG. 3, and a recess in the gain at an intermediate area of the band is slightly greater than that in FIG. 3. The reason is that the interval between the fifth channel and the sixth channel is wider.

Figure 6:
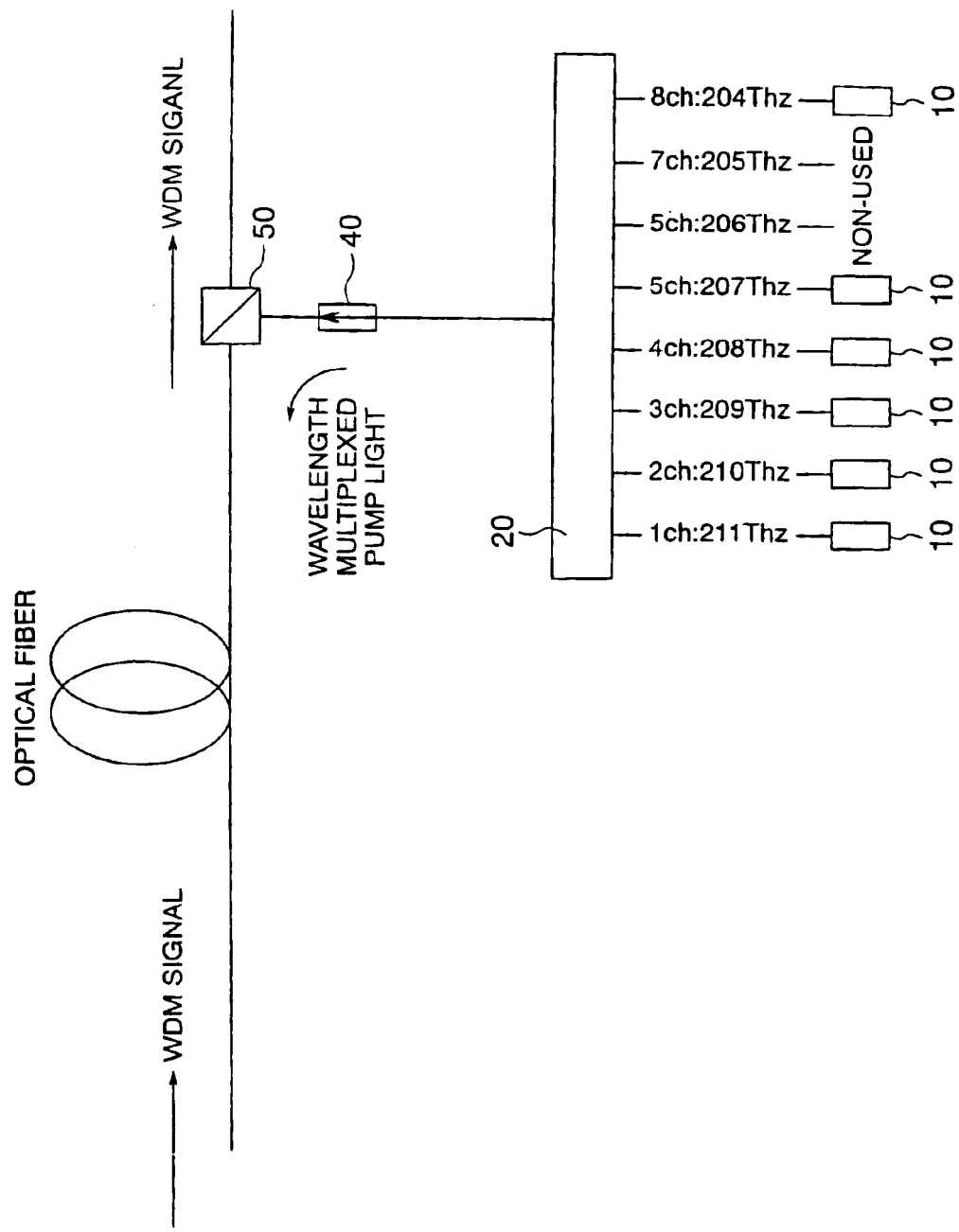
FIG. 6 is an explanatory view showing a Raman amplifier according to a second embodiment of the present invention.
Figure 7:
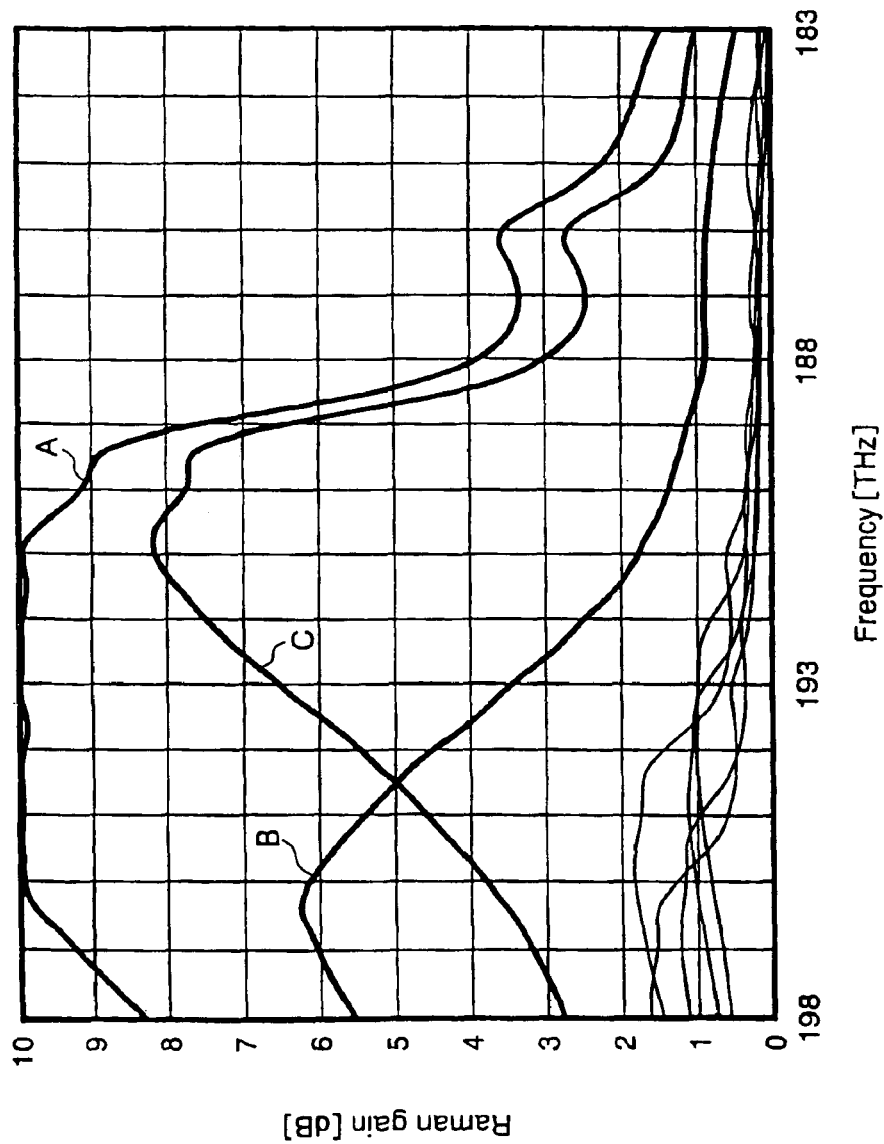
FIG. 7 is a view showing Raman gain profiles obtained when a pump source shown in FIG. 6 is used.
Figure 8:
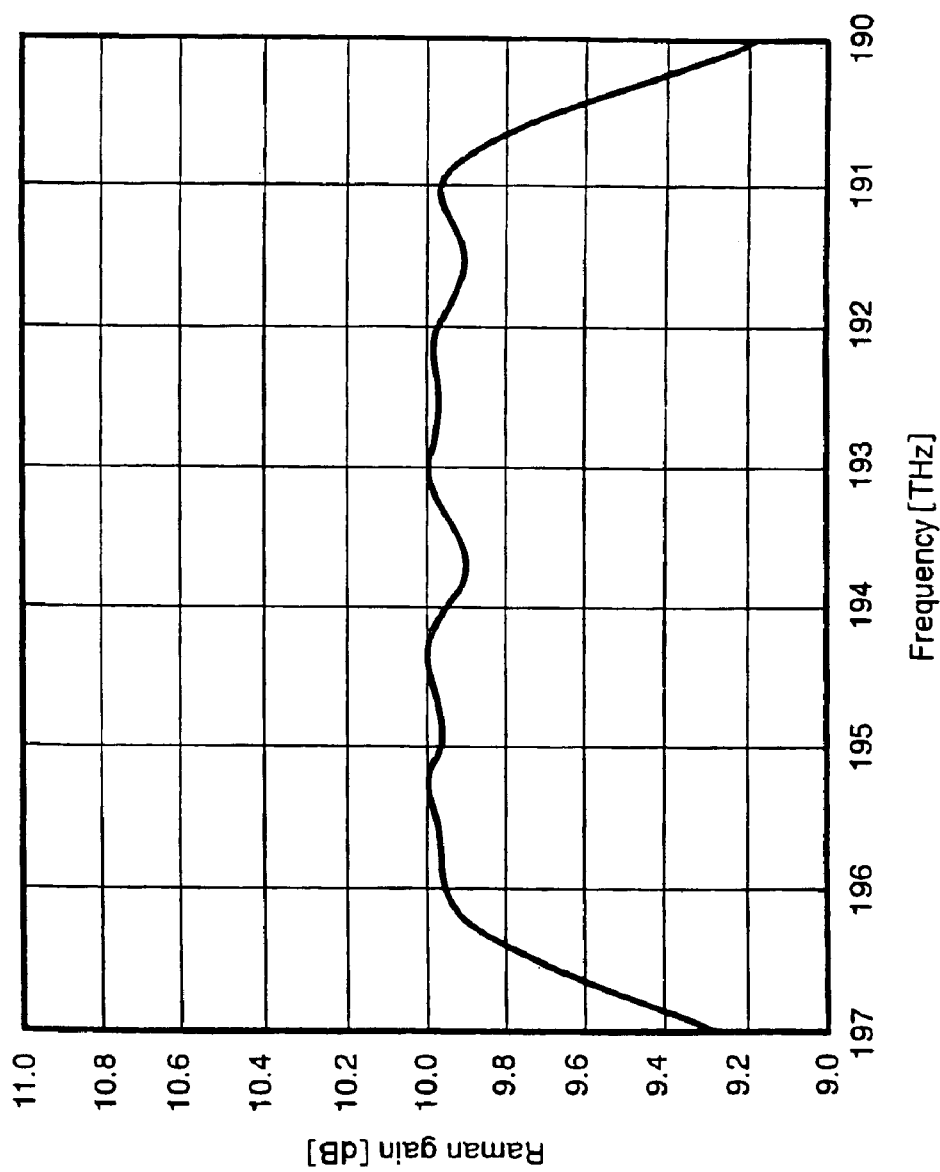
FIG. 8 is an enlarged view showing a total gain shown in FIG. 7.

FIG. 6 shows a second embodiment of the present invention which corresponds to claims 2 and 3. Frequency of the first channel is 211 THz (corresponding to a wavelength of 1420.8 nm), and frequencies of second to eighth channels are equidistantly distributed between 210 THz (corresponding to a wavelength of 1427.6 nm) and 204 THz (corresponding to a wavelength of 1469.6 nm) with interval of 1 THz. The total number of channels is eight (8), and a pump source is constituted by using six wavelengths other than sixth and seventh channels. As explained in connection with the first embodiment, the pump lights of respective channels may be selected on demand. For each of pump light sources 10 of respective wavelengths shown in FIG. 6, pump power obtained by combining outputs of semi-conductor lasers of Fabry-Perot type wavelength-stabilized by fiber Bragg grating (FBG) by means of a polarization beam coupler (PBC). Polarization beam coupling is an action for increasing pump power of the each wavelength and at the same time for reducing polarization beam dependency of Raman gain. If the pump power outputted from the single laser is sufficient, after the laser output was non-polarized, it may be connected to a wavelength multiplexer. A multiplexer 20 of Mach-Zehnder interferometer type shown in FIG. 6 serves to multiplex or combine pump lights of a plurality of wavelength having adjacent wavelengths with constant frequency interval. A dielectric filter 30 shown in FIG. 6 serves to combine two relatively wide wavelength bands and can combine a wavelength greater than a certain wavelength with a wavelength smaller than the certain wavelength. In FIG. 6, the pump light outputted from the multiplexer 20 of Mach-Zehnder interferometer type is sent to a dielectric filter 50 through an isolator 40 to amplify a WDM signal in an optical fiber. FIG. 7 shows Raman gain profiles obtained when the pump sources shown in FIG. 6 are used. A curve A represents total gain, a curve B represents a sum of gains obtained by the pump lights of the first to fifth channels, a curve C represents gain of the eighth channel, and fine line curves represent gains obtained by the pumping wavelengths of the first to fifth channels. Also in this case, by adding a positive gain tilt obtained from the pump lights at the long wavelength side to a negative gain tilt obtained from the pump lights at the short wavelength side, the total Raman gain is flattened. FIG. 8 is an enlarged view of the total gain. A property in which peak gain is 10 dB and a gain band is about 196 THz (wavelength: 1529.6 nm) to 191 THz (wavelength: 1569.6 nm) and gain deviation is about 0.1 dB can be realized. Comparing with FIG. 5 and FIG. 3, the gain band is further widened. The reason is that the longest pumping wavelength is set as a longer wavelength.

Figure 9:
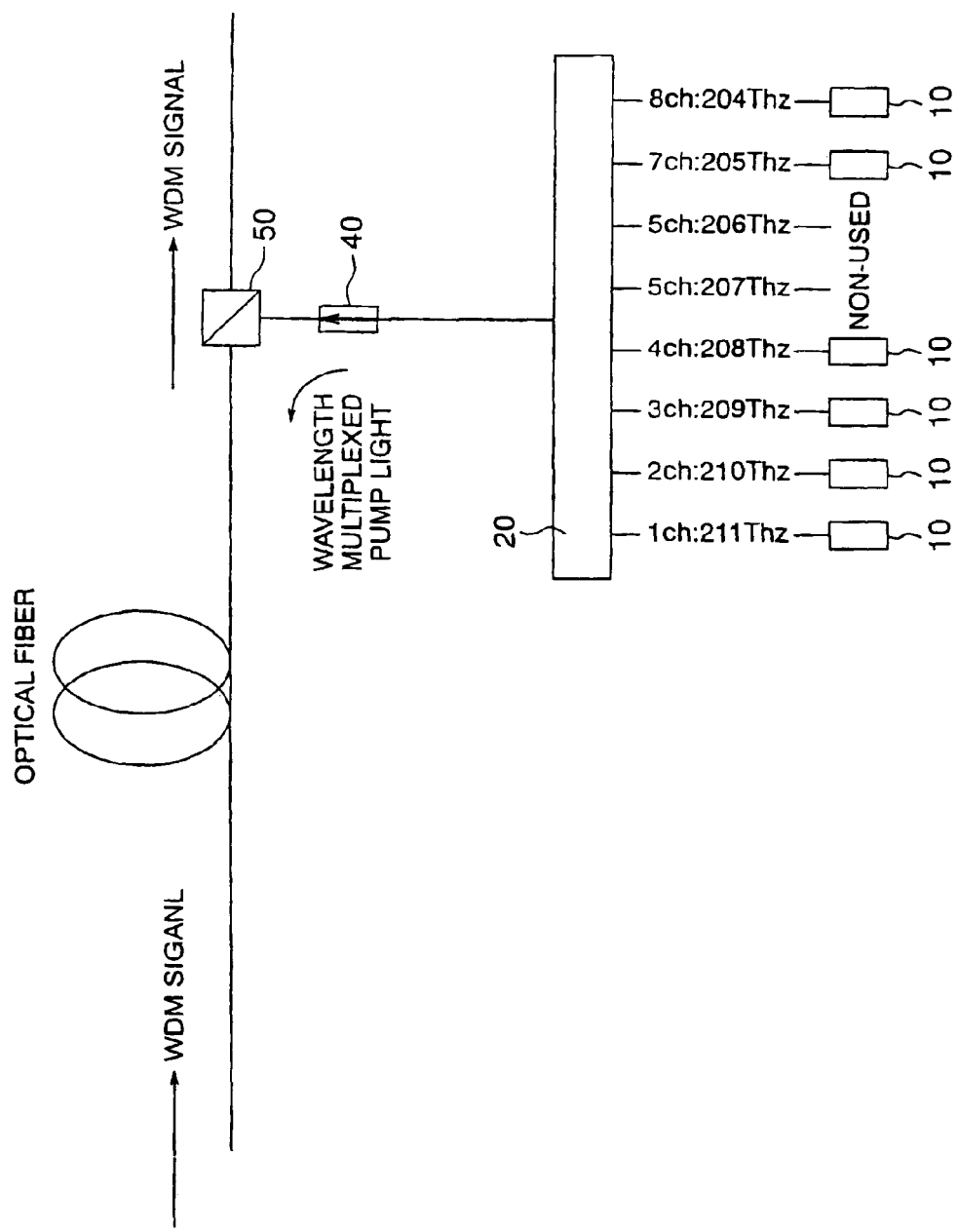
FIG. 9 is an explanatory view showing a Raman amplifier according to a third embodiment of the present invention.
Figure 10:
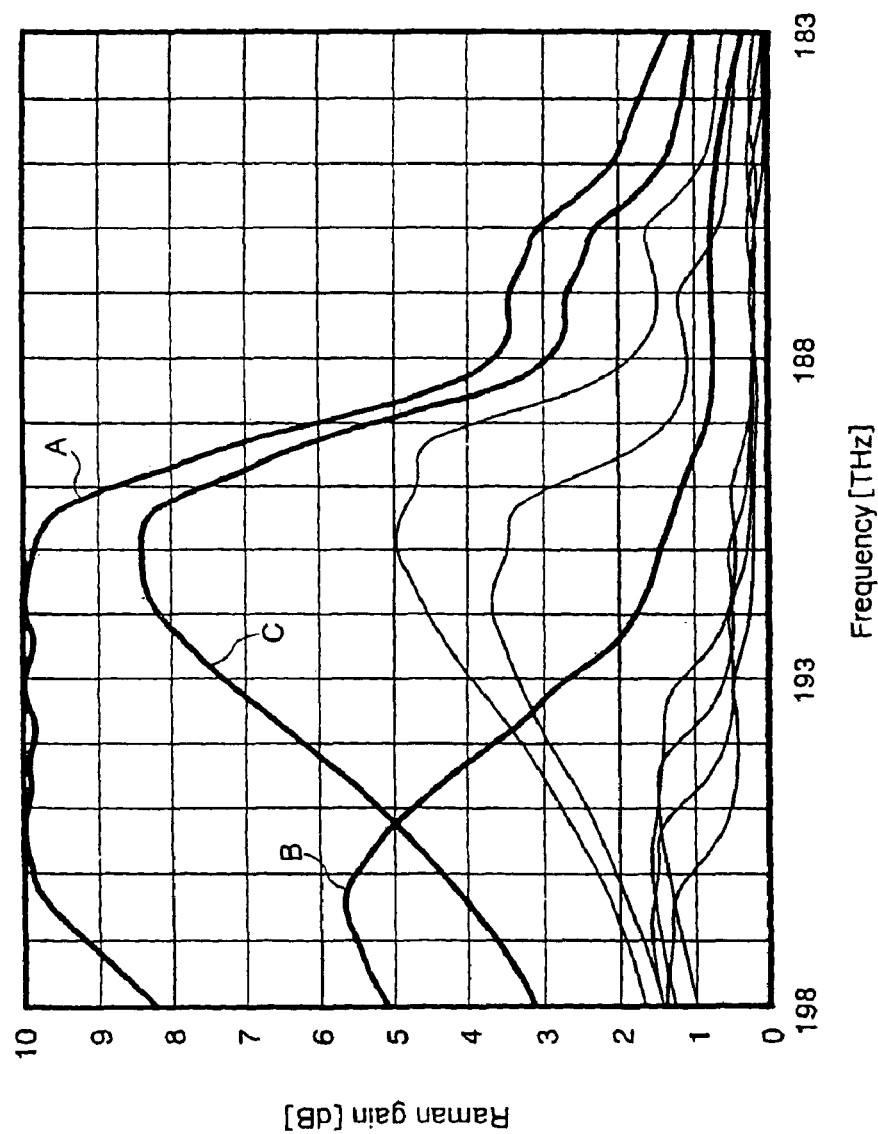
FIG. 10 is a view showing Raman gain profiles obtained when a pump source shown in FIG. 9 is used.
Figure 11:
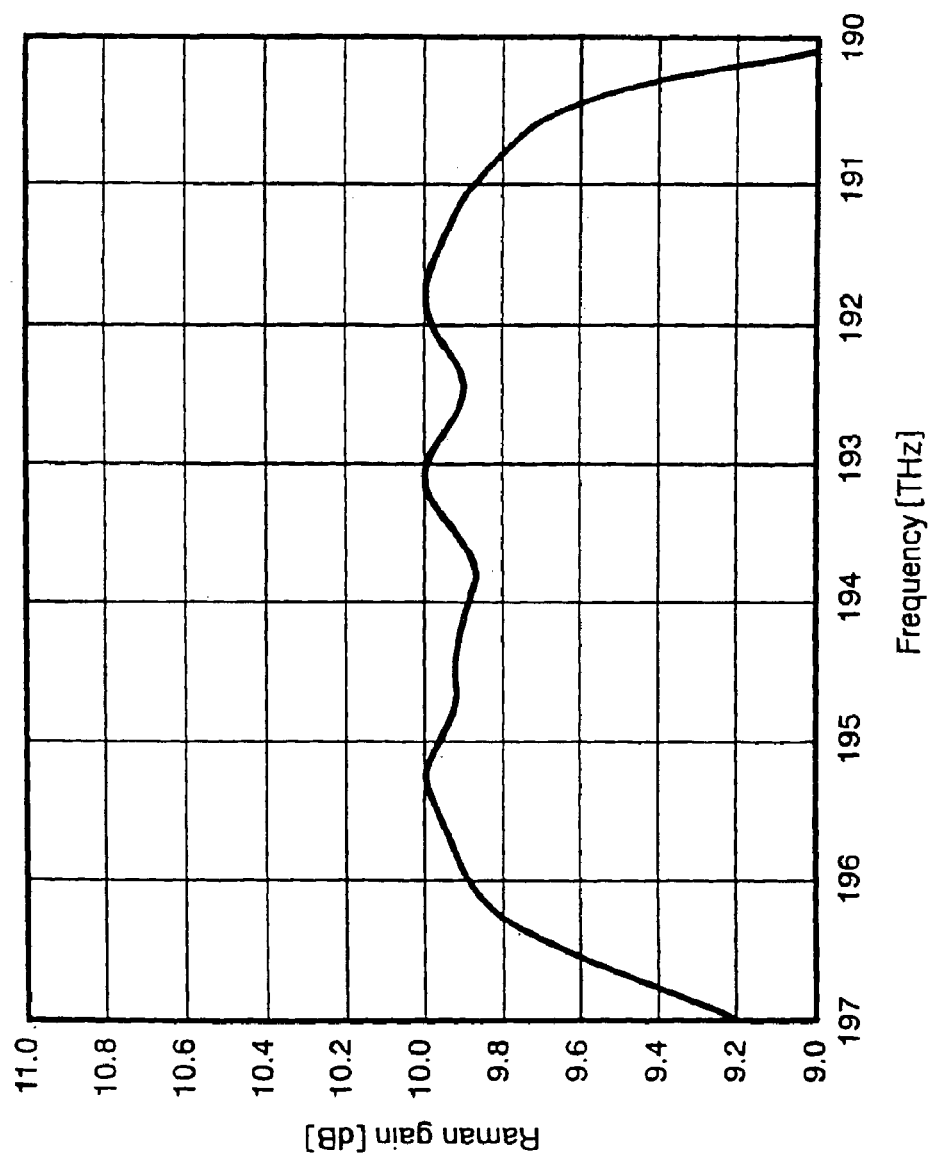
FIG. 11 is an enlarged view showing a total gain shown in FIG. 10.

FIG. 9 shows a third embodiment of the present invention which corresponds to claims 2 and 4. Similar to the second embodiment, frequency of the first channel is 211 THz (corresponding to a wavelength of 1420.8 nm), and frequencies of second to eighth channels are equidistantly distributed between 210 THz (corresponding to a wavelength of 1427.6 nm) and 204 THz (corresponding to a wavelength of 1469.6 nm) with interval of 1 THz. The total number of channels is eight (8), and a pump source is constituted by using six wavelengths other than fifth and sixth channels. For each of pump sources 10 of respective wavelengths shown in FIG. 9, pump power obtained by combining outputs of semi-conductor lasers of Fabry-Perot type wavelength-stabilized by fiber Bragg grating (FBG) by means of a polarization beam coupler (PBC). Polarization beam coupling is an action for increasing pump power of the each wavelength and at the same time for reducing polarization beam dependency of Raman gain. If the pump power outputted from the single laser is sufficient, after the laser output was non-polarized, it may be connected to a wavelength multiplexer. A multiplexer 20 of Mach-Zehnder interferometer type shown in FIG. 9 serves to multiplex or combine pump lights of a plurality of wavelength having adjacent wavelengths with constant frequency interval. A dielectric filter 30 shown in FIG. 9 serves to combine two relatively wide wavelength bands and can combine a wavelength greater than a certain wavelength with a wavelength smaller than the certain wavelength. In FIG. 9, the pump light outputted from the multiplexer 20 of Mach-Zehnder interferometer type is sent to a dielectric filter 50 through an isolator 40 to amplify a WDM signal in an optical fiber. FIG. 10 shows Raman gain profiles obtained when the pump sources shown in FIG. 9 are used. A curve A represents total gain, a curve B represents a sum of gains obtained by the pump lights of the first to fourth channels, a curve C represents a sum of gains of the seventh and eighth channels, and fine line curves represent gains obtained by the respective pumping wavelengths. Also in this case, by adding a positive gain tilt obtained from the pump lights at the long wavelength side to a negative gain tilt obtained from the pump lights at the short wavelength side, the total Raman gain is flattened. FIG. 11 is an enlarged view of the total gain. A property in which peak gain is 10 dB and a gain band is about 196 THz (wavelength: 1529.6 nm) to 191 THz (wavelength: 1569.6 nm) and gain deviation is about 0.1 dB can be realized. Here, a difference in magnitude of the gains obtained by the pumping wavelengths in the second embodiment and the third embodiment should be noticed. In FIG. 7, there is a channel having about 8 dB at the maximum; whereas, in FIG. 10, the maximum is about 5 dB. The reason is that, in the second embodiment, the gain shown by the curve C at the long wavelength side is formed by the gain of the single channel, whereas, in the third embodiment, the gain at the long wavelength side is formed by the sum of the gains of two channels. This means that the maximum value of the pump power required for each wave can be reduced, and it is very effective in view of the practical use.

Figure 12:
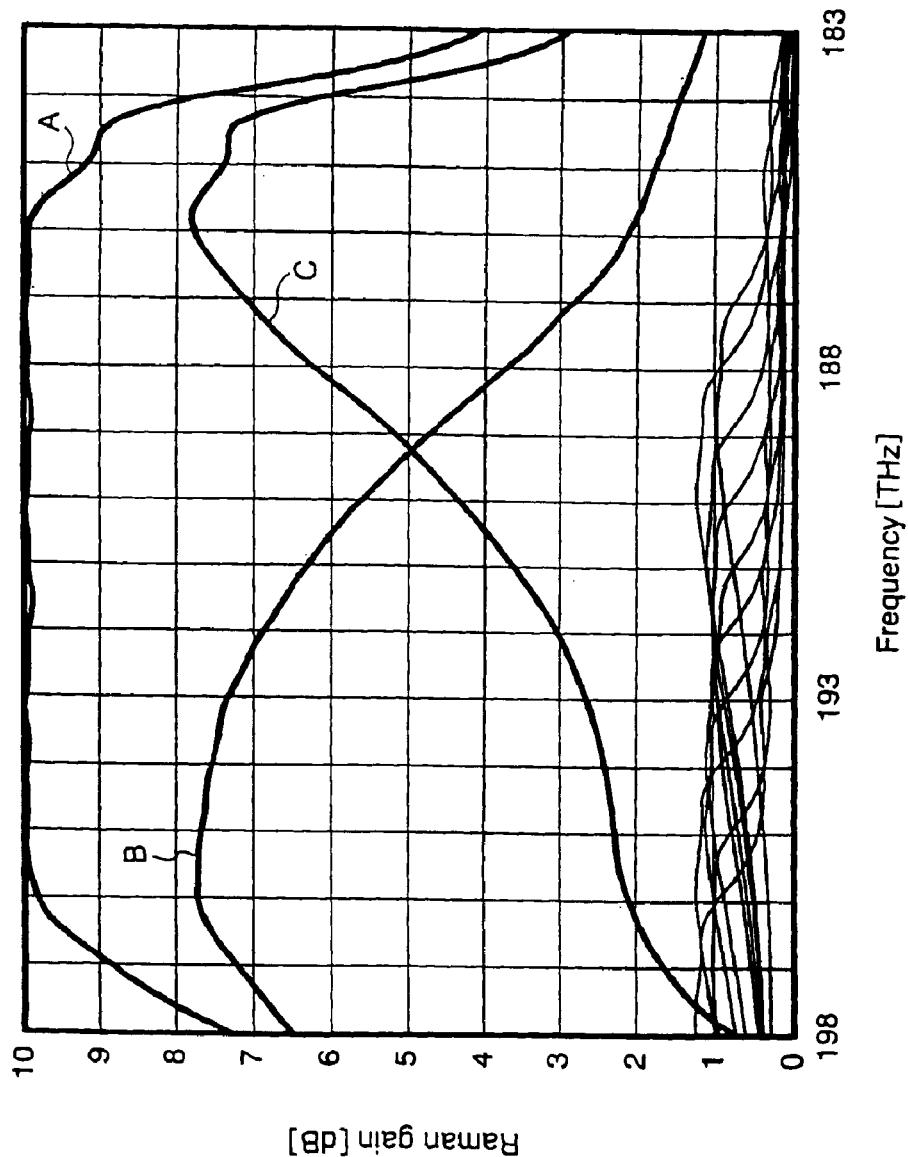
FIG. 12 is a view showing Raman gain profiles obtained when eleven channels are used among thirteen channels located equidistantly by 1 THz interval from 211 THz to 199 THz and when pump lights other than 201 THz and 200 THz are used.
Figure 13:
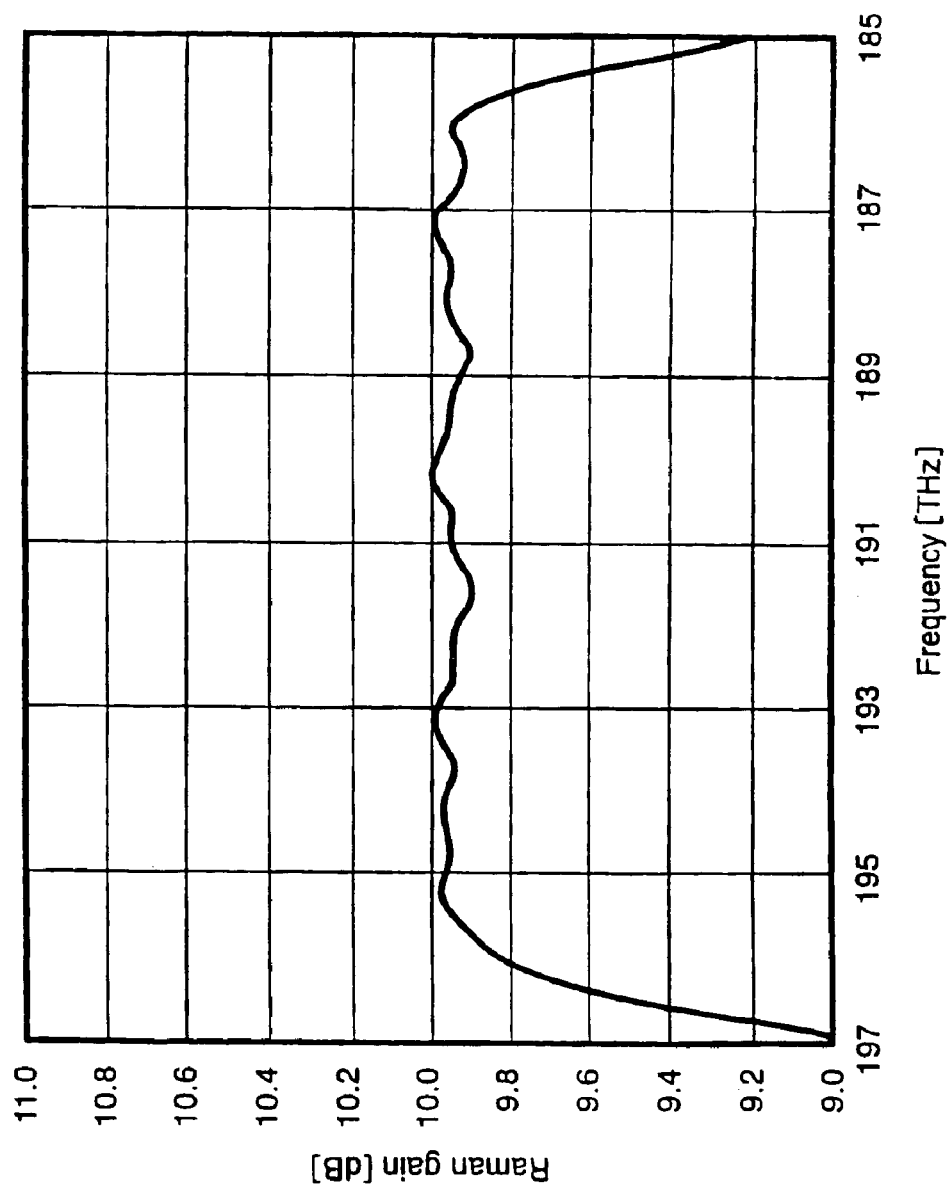
FIG. 13 is an enlarged view showing a total gain shown in FIG. 12.

FIGS. 12 to 15 show gain profiles obtained when eleven channels are used among thirteen channels spaced apart from each other with interval of 1 THz from 211 THz (wavelength: 1420.8 nm) to 199 THz (wavelength: 1506.5 nm). In FIG. 12, a construction specified in claim 3 is used and pump lights other than 201 THz and 200 THz are used. A curve A represents total gain, a curve B represents a sum of gains obtained by pump lights of first to tenth channels, a curve C represents gain of thirteenth channel, and fine line curves represent gains obtained by the pumping wavelengths of the first to tenth channels. Also in this case, by adding a positive gain tilt obtained from the pump lights at the long wavelength side to a negative gain tilt obtained from the pump lights at the short wavelength side, the total Raman gain is flattened. FIG. 13 is an enlarged view of the total gain. A property in which peak gain is 10 dB and a gain band is about 196 THz (wavelength: 1529.6 nm) to 186 THz (wavelength: 1611.8 nm) and gain deviation is about 0.1 dB can be realized.

Figure 14:
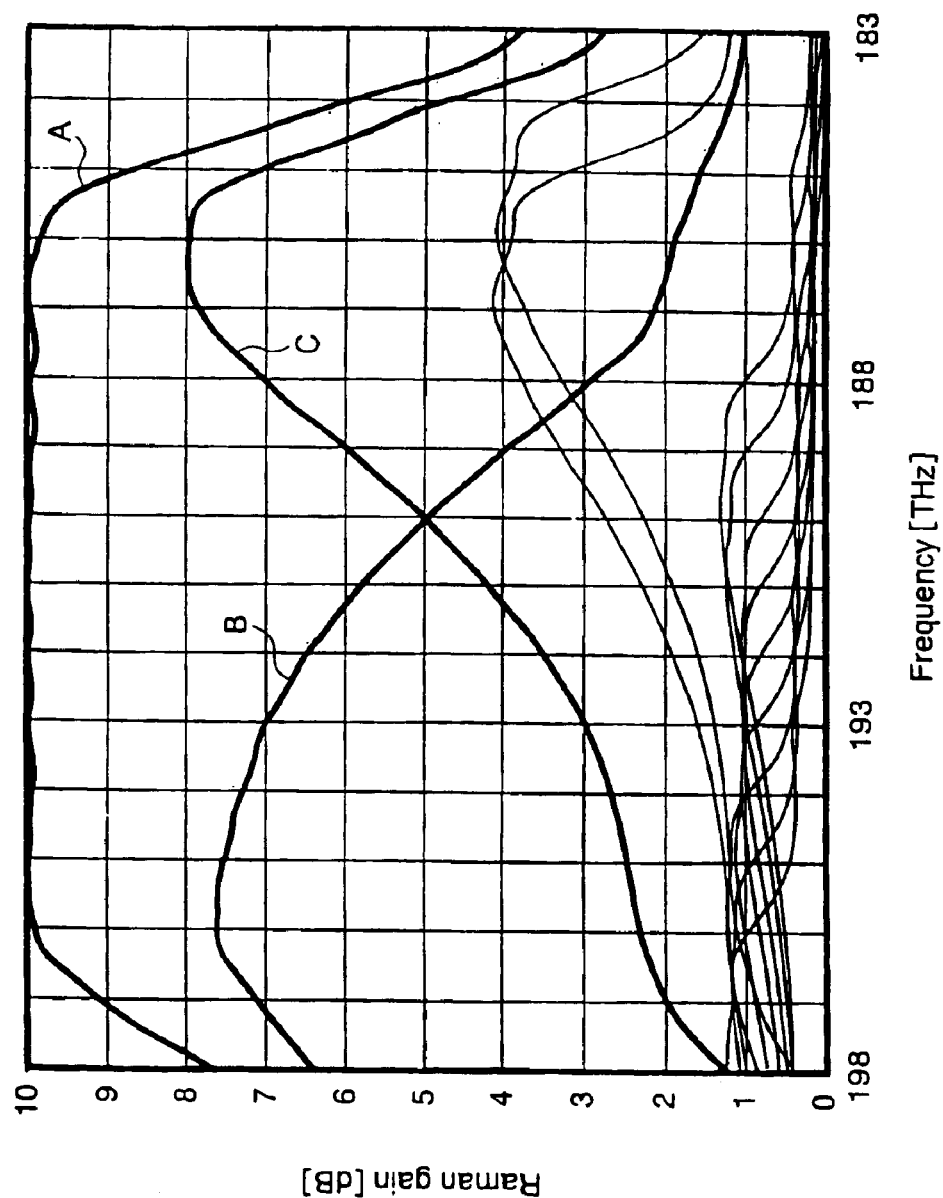
FIG. 14 is a view showing Raman gain profiles obtained when eleven channels are used among thirteen channels located equidistantly by 1 THz interval from 211 THz to 199 THz and when pump lights other than 202 THz and 201 THz are used.
Figure 15:
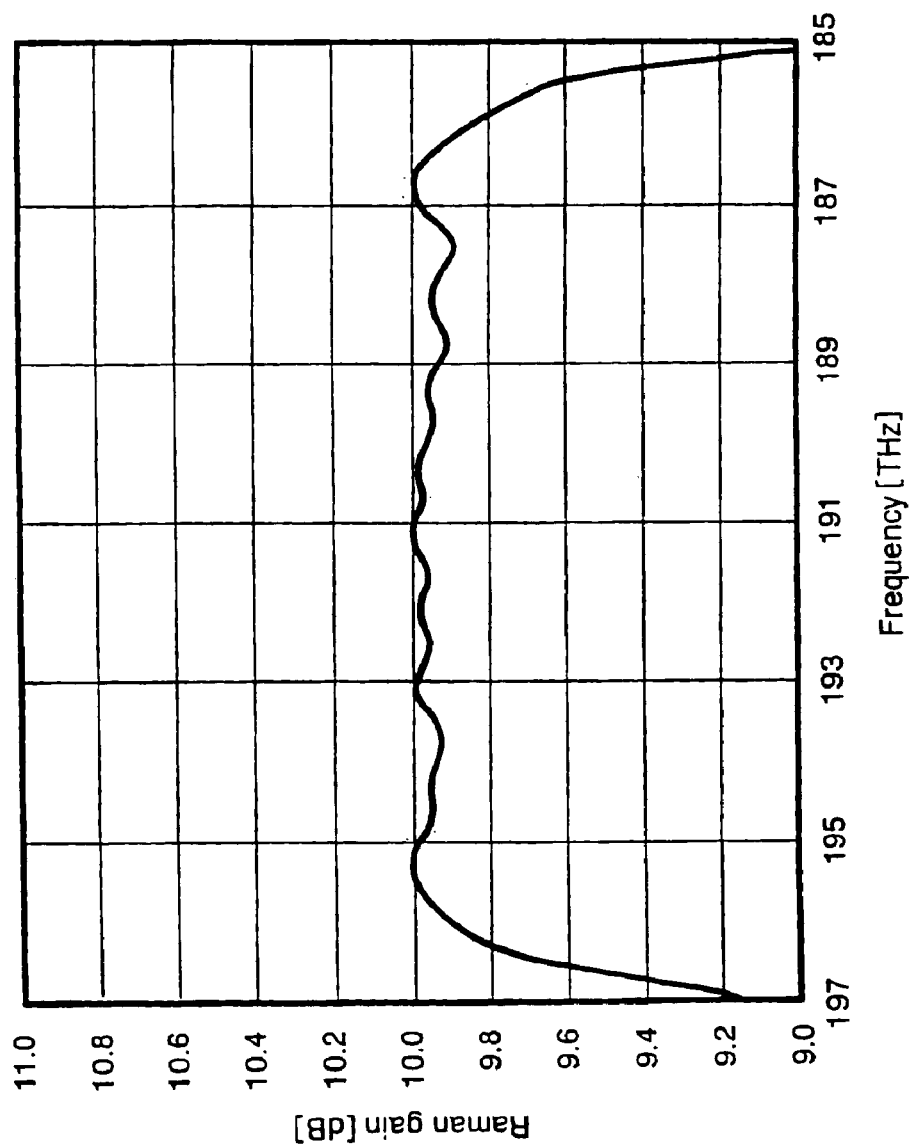
FIG. 15 is an enlarged view showing a total gain of gains shown in FIG. 14.

In FIG. 14, a construction specified in claim 4 is used and pump lights other than 202 THz and 201 THz are used. A curve A represents total gain, a curve B represents a sum of gains obtained by pump lights of first to ninth channels, a curve C represents a sum of gains of twelfth and thirteenth channel, and fine line curves represent gains obtained by the pumping wavelengths. Also in this case, by adding a positive gain tilt obtained from the pump lights at the long wavelength side to a negative gain tilt obtained from the pump lights at the short wavelength side, the total Raman gain is flattened. FIG. 15 is an enlarged view of the total gain. A property in which peak gain is 10 dB and a gain band is about 196 THz (wavelength: 1529.6 nm) to 186 THz (wavelength: 1611.8 nm) and gain deviation is about 0.1 dB can be realized. Further, as can be seen from comparison between FIG. 12 and FIG. 14, since the gain shown by the curve C at the long wavelength side is formed by the gain of the single channel in the second embodiment, whereas, in the third embodiment, the gain at the long wavelength side is formed by the sum of the gains of two channels, the maximum value of the gain required for each wave is smaller in FIG. 14 than in FIG. 12. This means that the maximum value of the pump power required for each wave can be reduced, and it is very effective in view of the practical use.

Figure 16:
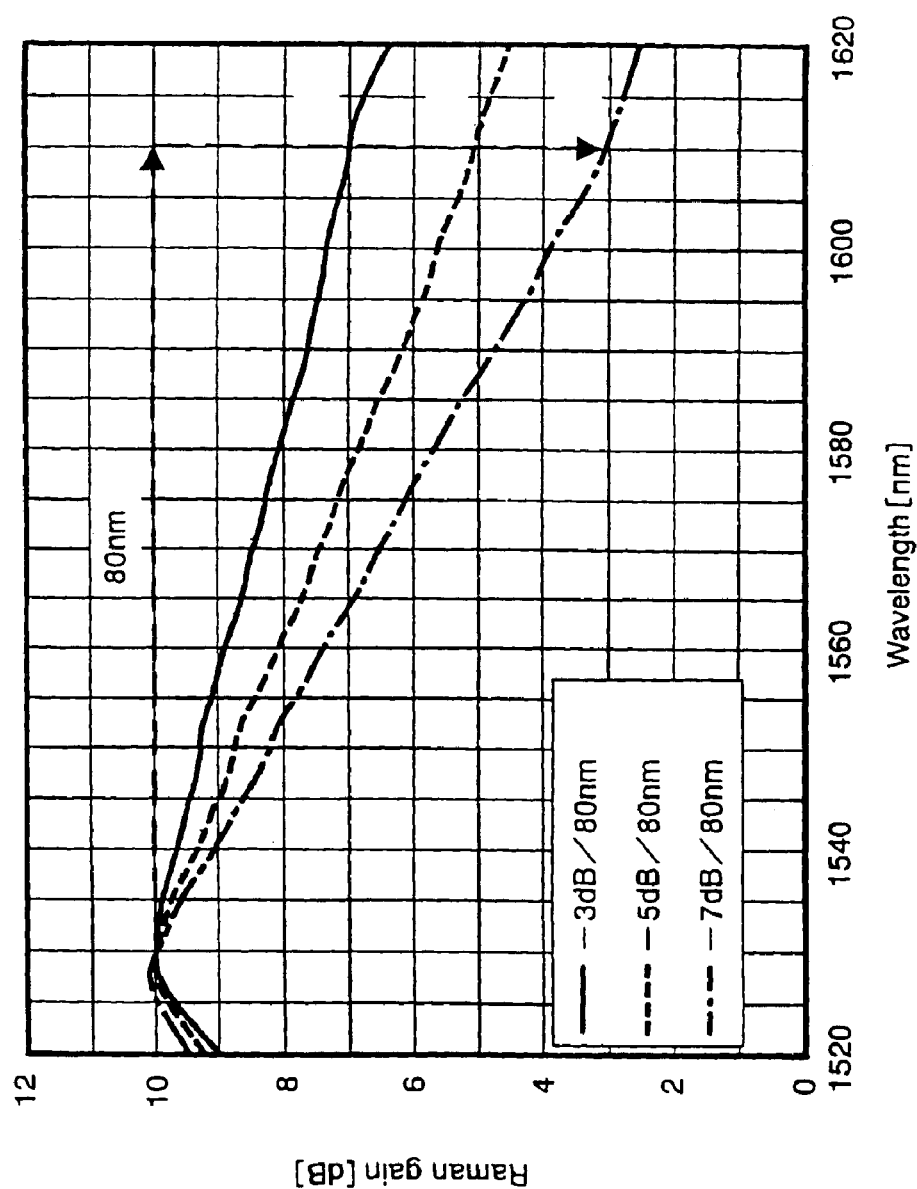
FIG. 16 is a view showing Raman gain profiles obtained when the same pump source as those in FIG. 12 are used.

FIG. 16 shows gain profiles obtained when the same pump sources as those in FIG. 12 are used, and, linear negative gain tilts are realized by reducing the gains at the long wavelength side. By using such a Raman amplifier, positive gain tilt due to the Raman effect between the optical signals described in the paper written by Bigo et al is compensated, and the WDM signal can be maintained to the flat level in the optical amplifying relay system. For example, in FIG. 2 of the paper written by Bigo et al, gain tilt of 2.3 dB is generated at 25 nm, and, by adding reverse tilt for causing reduction of 7.4 dB (converted at 80 nm) to the former tilt, the tilt of optical signal level due to the Raman effect between the optical signals can be cancelled. In FIG. 16, although the gain tilts for causing reduction of 3 dB, 5 dB and 7 dB at 80 nm are shown, since they are 2.2 dB, 1.6 dB and 0.9 dB converted at 25 nm, even under the condition shown in FIG. 3 of the above-mentioned paper, it is considered that the gain tilt can be compensated for.

EXAMPLE 1

Figure 17:
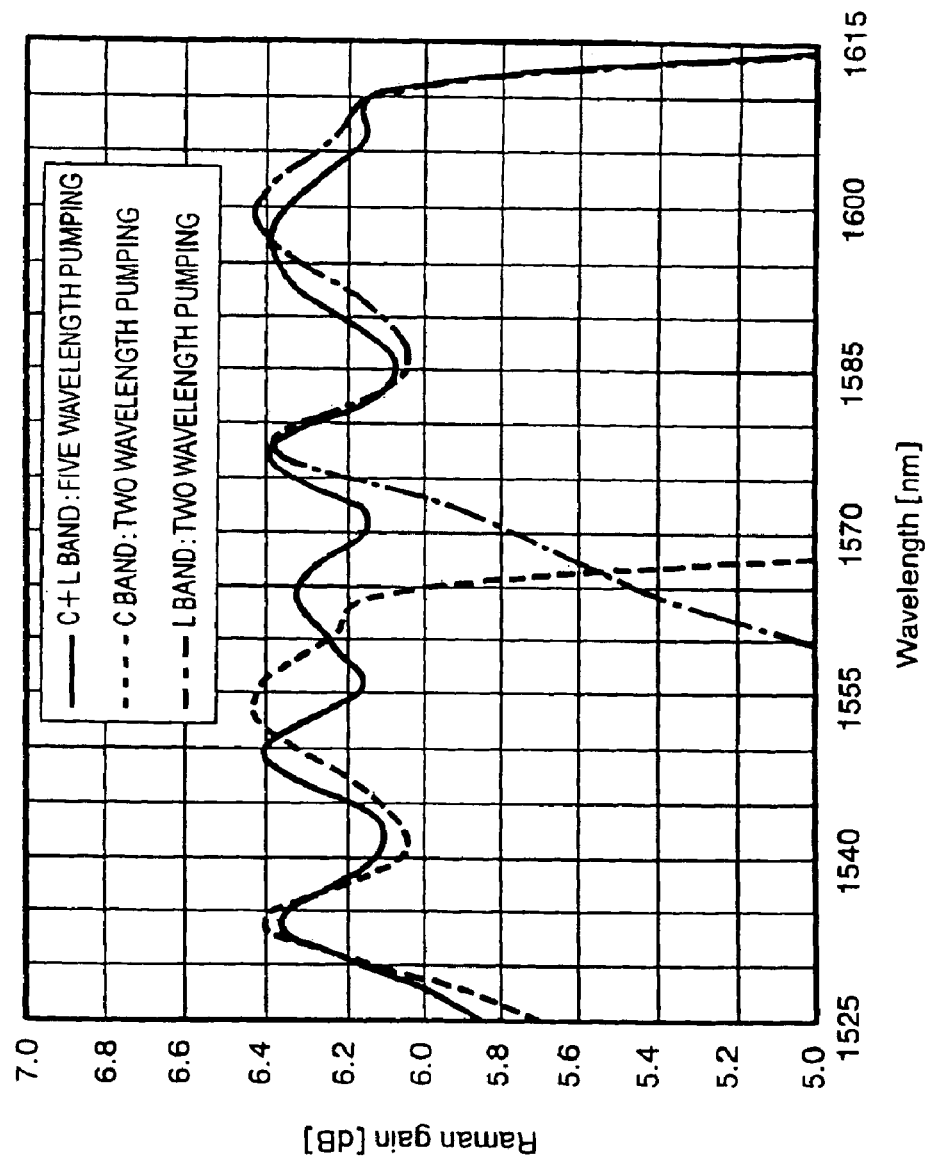
FIG. 17 is an explanatory view showing gain properties when pump light before expansion has two wavelengths.

Now, the Raman amplifier according to the present invention will be explained in connection with an example that the band is expanded to C+L band by combining the C band and the L band. FIG. 17 shows an example that the pump light has two wavelengths before expansion, and there are pumping wavelengths before and after expansion, as shown in the following Table 6. By selecting one of pumping wavelengths added for the expansion to 1439 nm, at least one of the pump lights added for the expansion is located within the band of the pump lights (1426 nm to 1453 nm) before expansion. Due to the presence of such pump light, the expansion can be realized while maintaining the gain flatness.

TABLE 6

| Pumping wavelength [nm] | After expansion | Before expansion | Addition |
| --- | --- | --- | --- |
| 1426 | ○ | ○ | |
| 1439 | ○ | | ○ |
| 1453 | ○ | ○ | |
| 1464 | ○ | | ○ |
| 1493 | ○ | | ○ |

Figure 18:
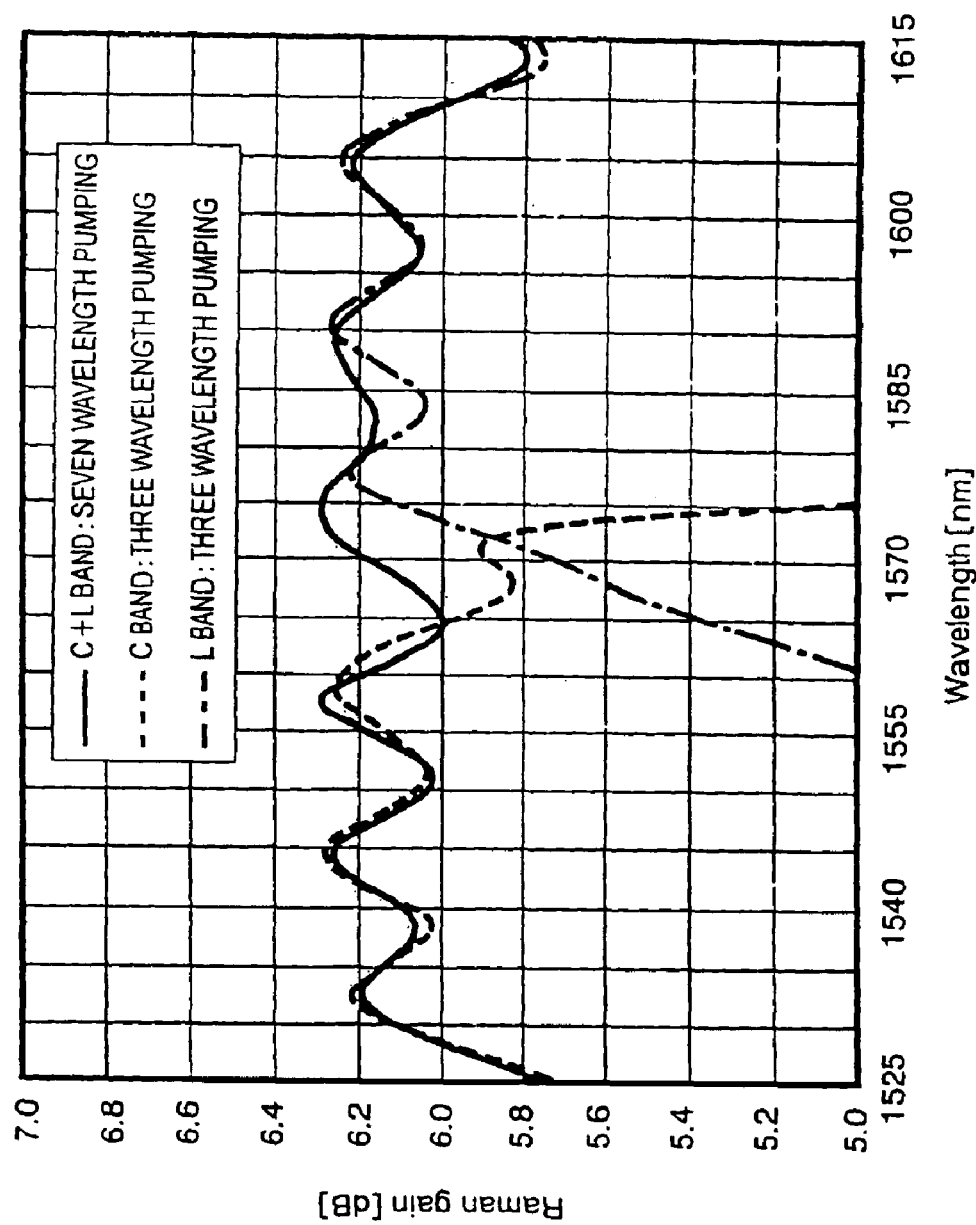
FIG. 18 is an explanatory view showing gain properties when pump light before expansion has three wavelengths.

FIG. 18 shows an example that the pump light has three wavelengths before expansion, and there are pumping wavelengths before and after expansion, as shown in the following Table 7. By selecting one of pumping wavelenghts added for the expansion to 1446 nm, at least one of the pump lights added for the expansion is located within the band of the pump lights (1424 nm to 1460 nm) before expansion. Due to the presence of such pump light, the expansion can be realized while maintaining the gain flatness.

TABLE 7

| Pumping wavelength [nm] | After expansion | Before expansion | Addition |
| --- | --- | --- | --- |
| 1424 | ○ | ○ | |
| 1435 | ○ | ○ | |
| 1446 | ○ | | ○ |
| 1460 | ○ | ○ | |
| 1463 | ○ | | ○ |
| 1475 | ○ | | ○ |
| 1500 | ○ | | ○ |

Figure 19:
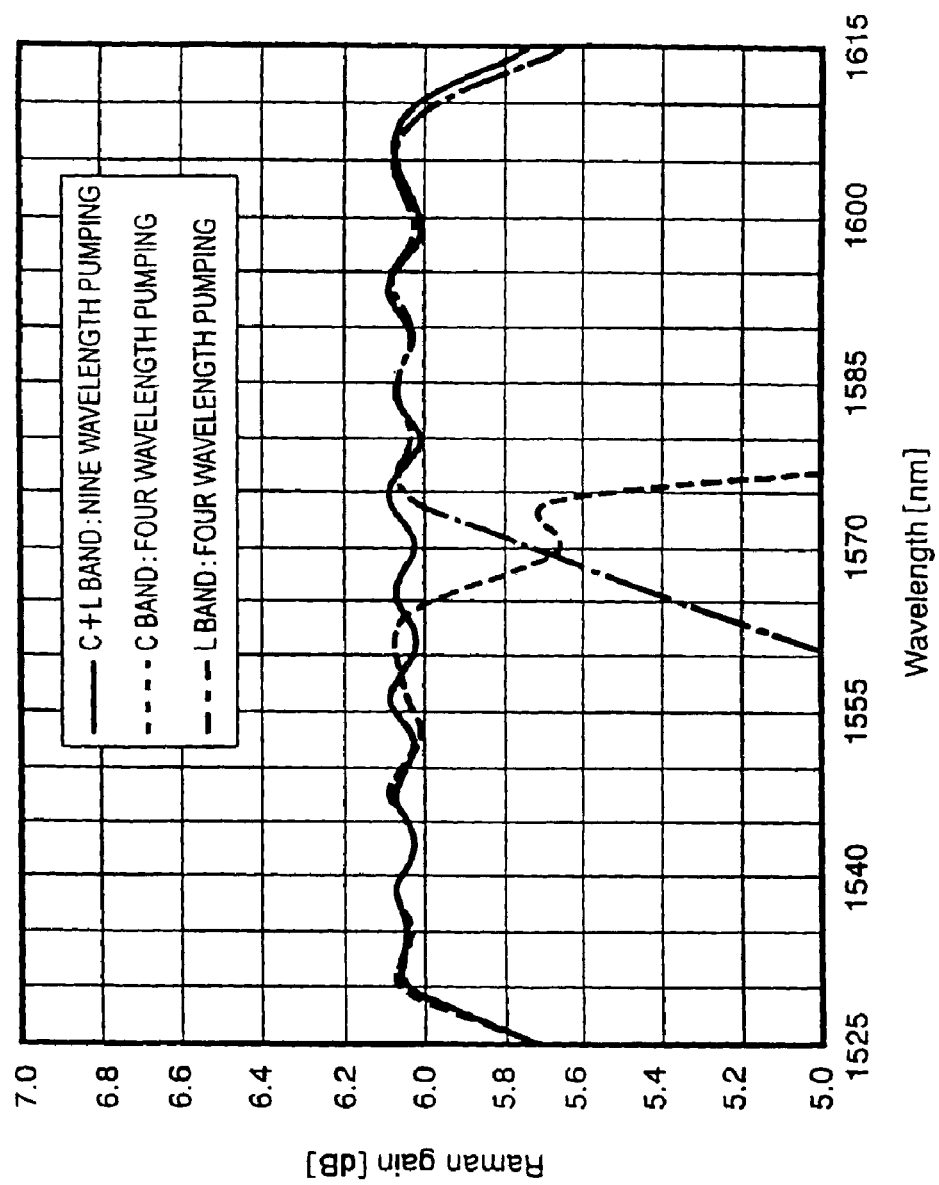
FIG. 19 is an explanatory view showing gain properties when pump light before expansion has four wavelengths.
Figure 20:
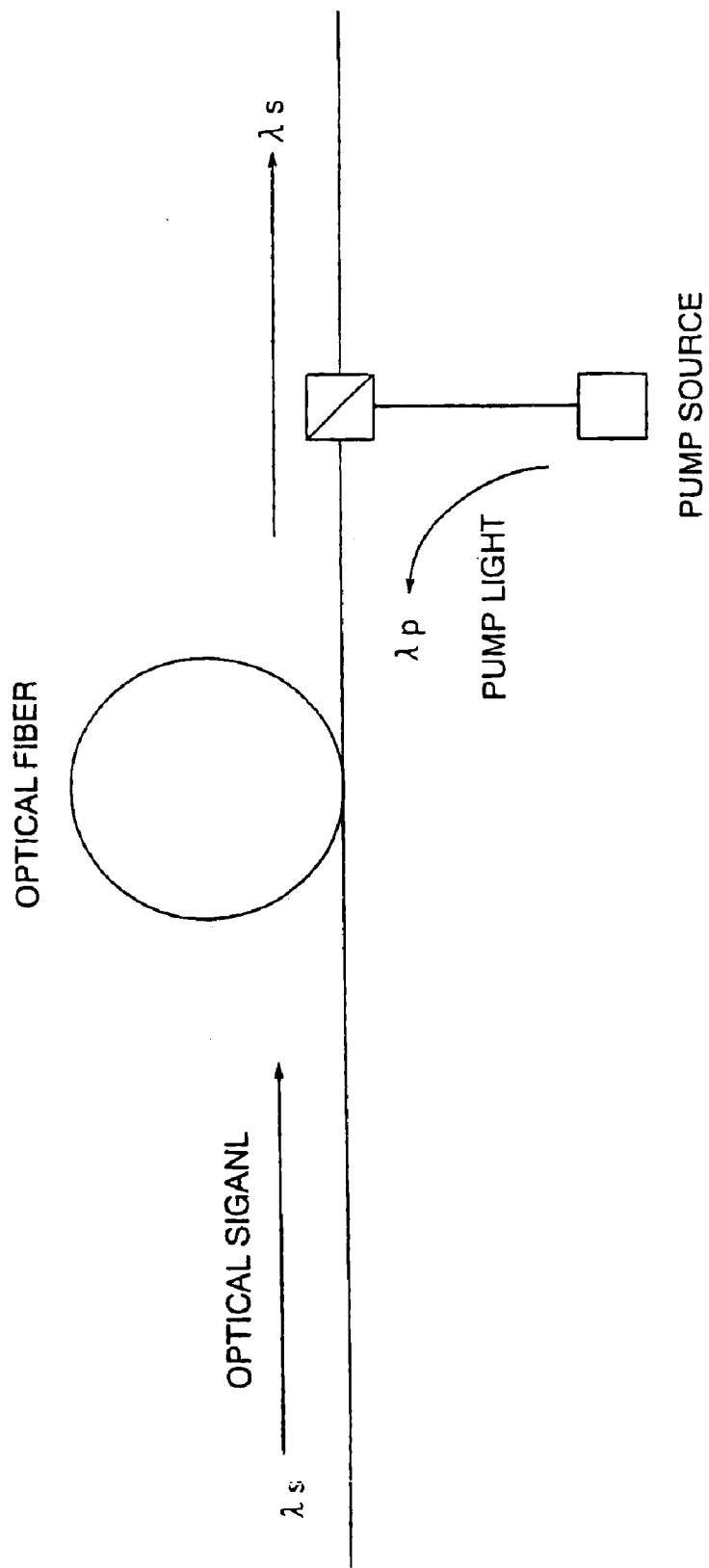
FIG. 20 is an explanatory view for a Raman amplifier.
Figure 21:
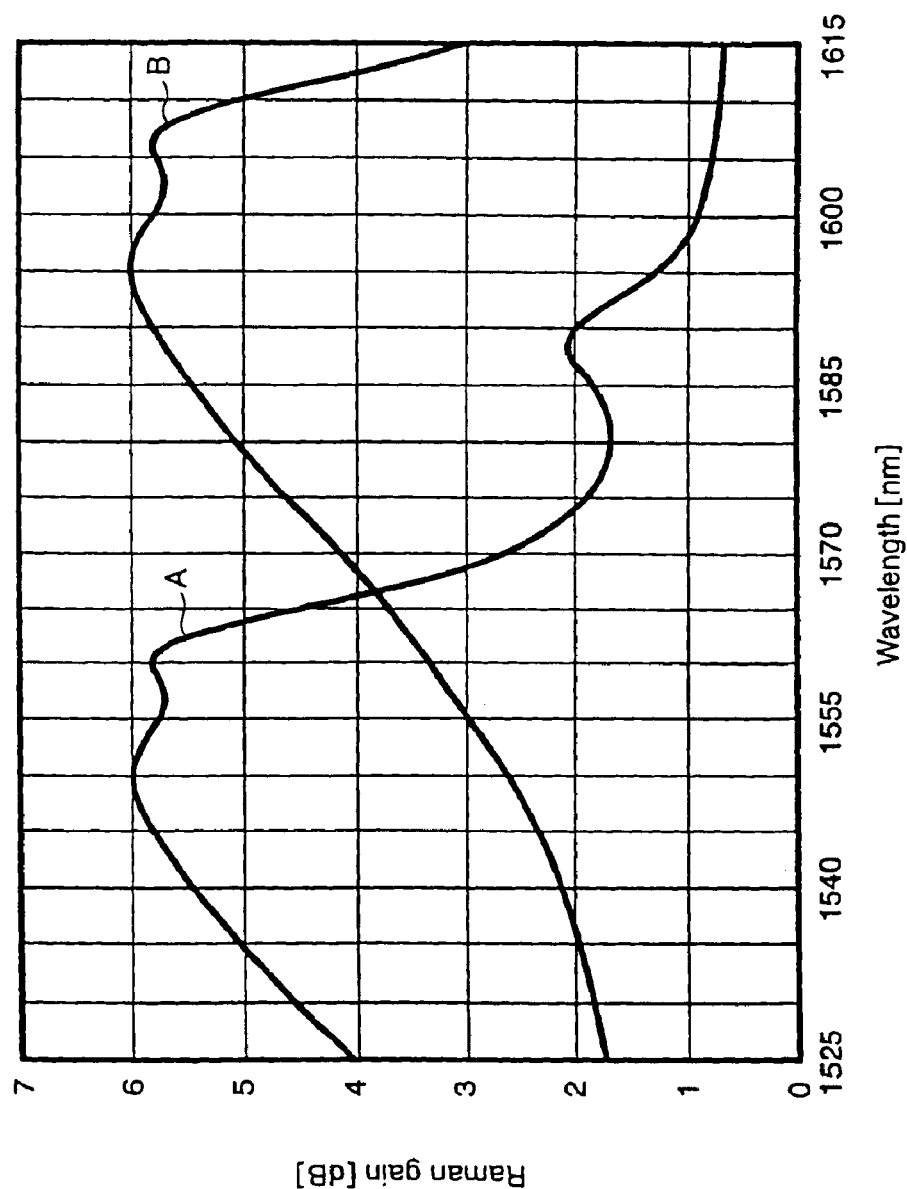
FIG. 21 is an explanatory view showing gain properties when a C-band and an L-band are pumped by a single wavelength, respectively.
Figure 22:
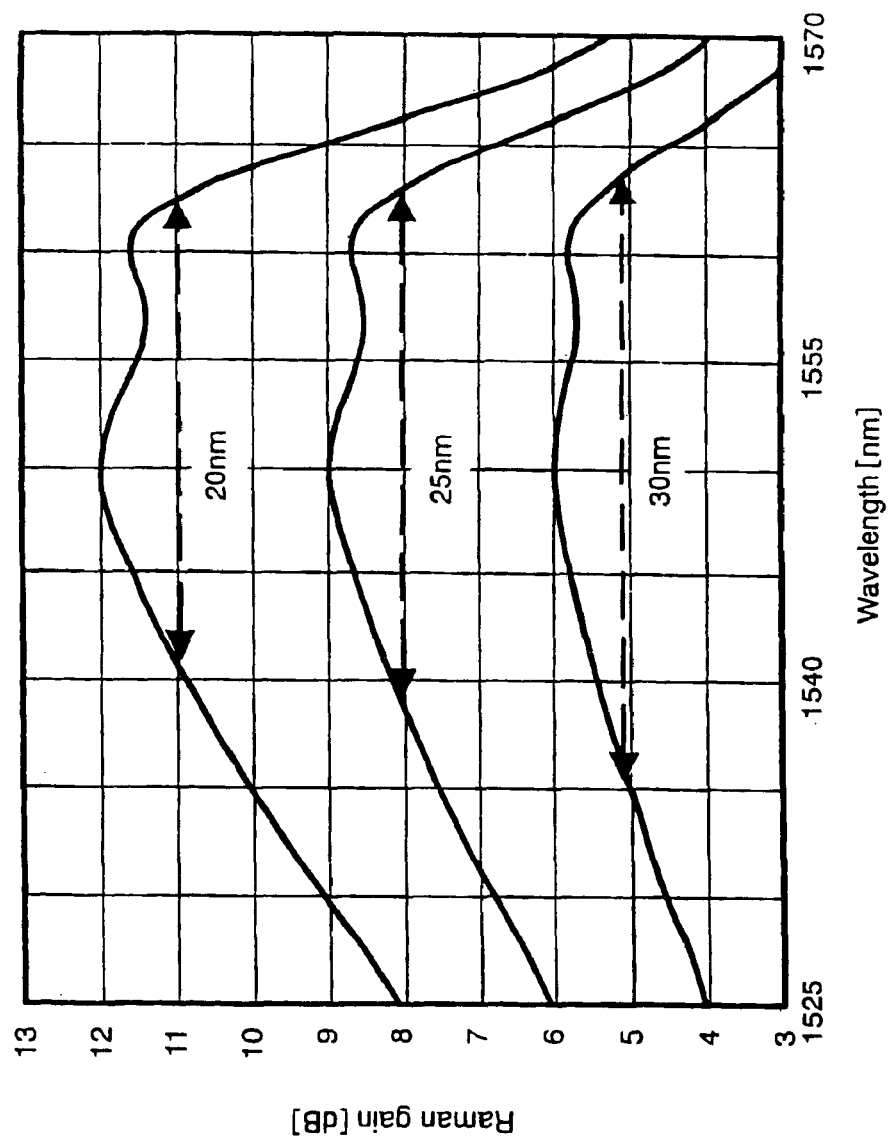
FIG. 22 is a view showing a relationship between size of gain and a gain band width.
Figure 23A:
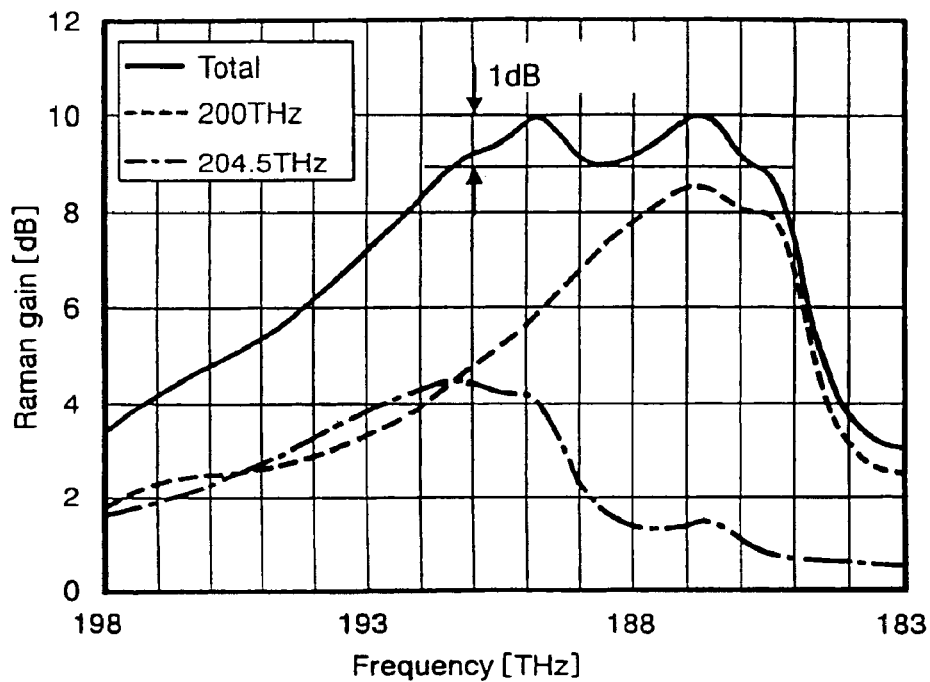
FIGS. 23A and 23B are views showing Raman gain profiles obtained when the pump light intervals are selected to 4.5 THz and 5 THz, respectively and DSF is used as an amplifying fiber.
Figure 23B:
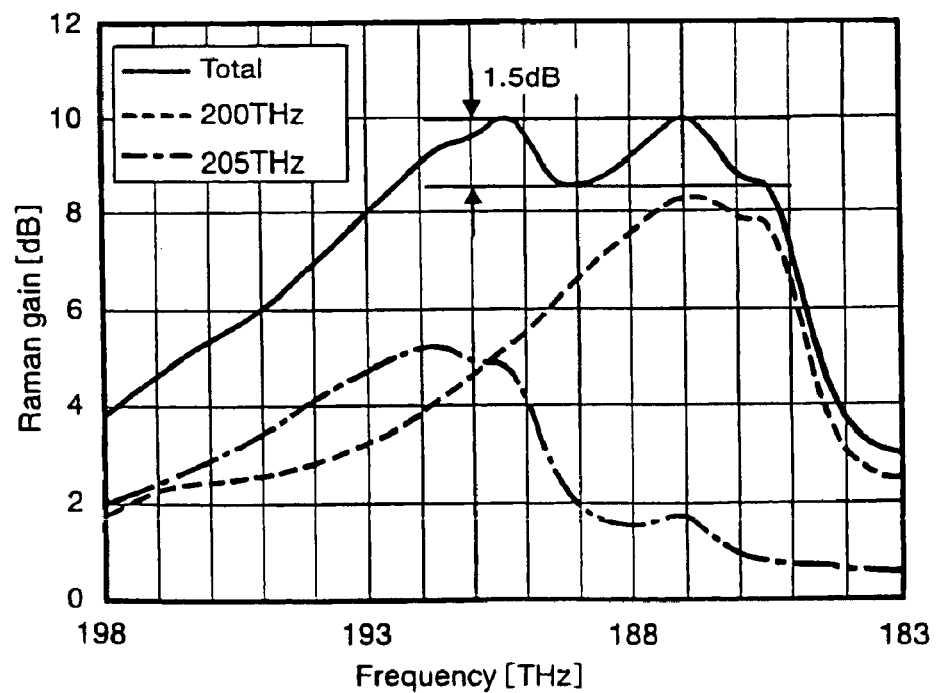
Figure 24:
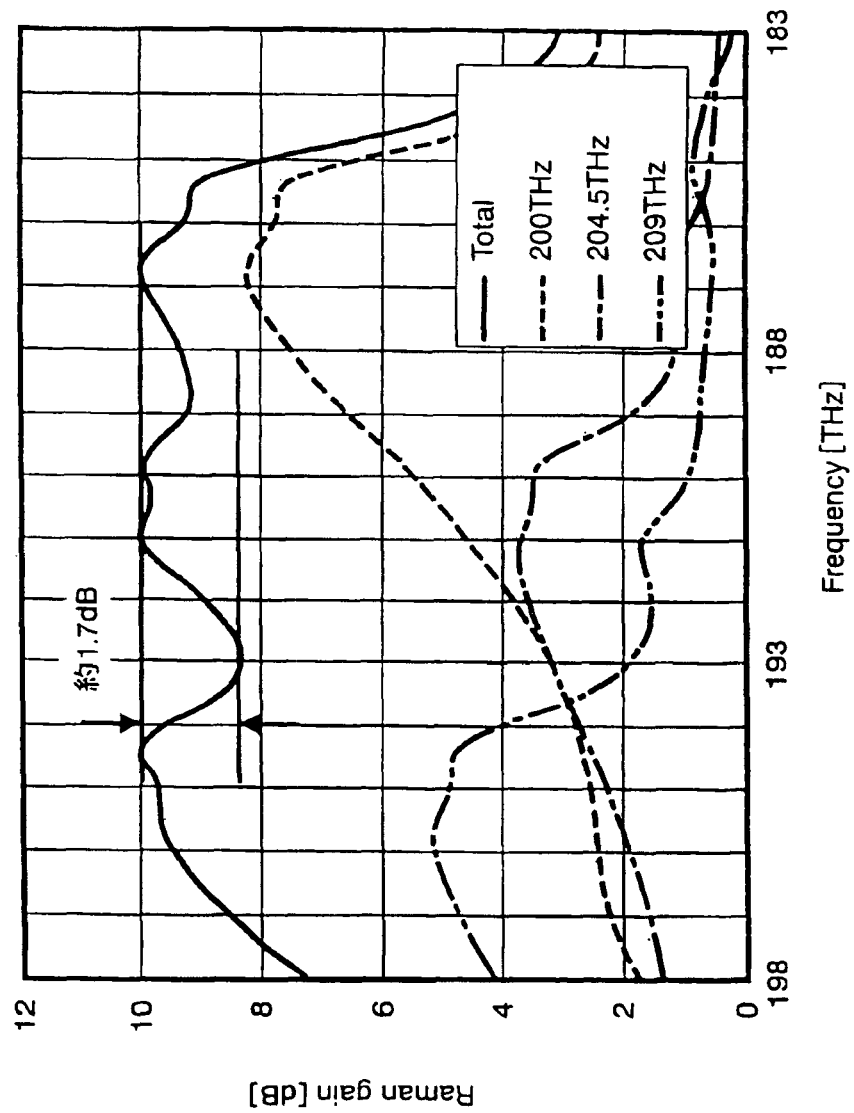
FIG. 24 is a view showing Raman gain profiles obtained when three wavelengths with pump light interval of 4.5 THz are used.
Figure 25:
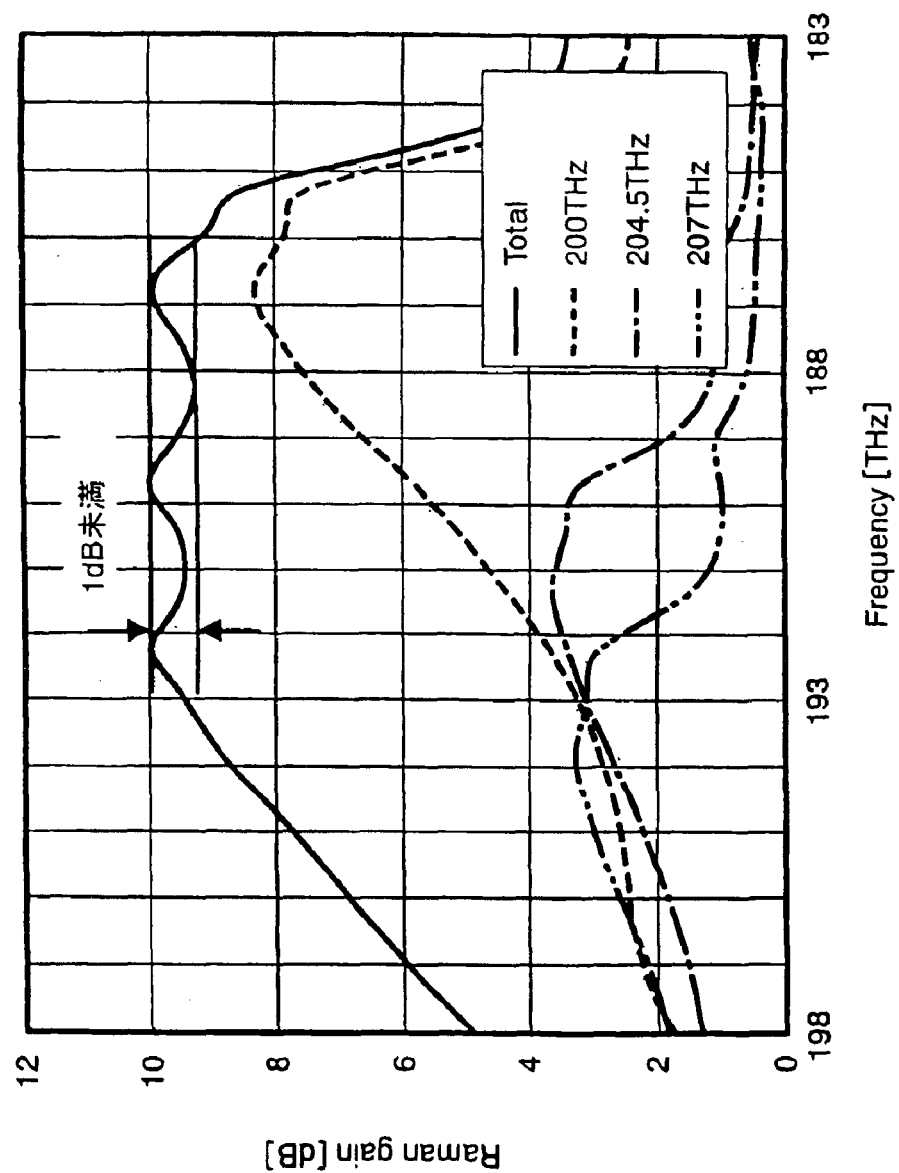
FIG. 25 is a view showing Raman gain profiles obtained when three wavelengths with pump light intervals of 2.5 THz and 4.5 THz are used.
Figure 26:
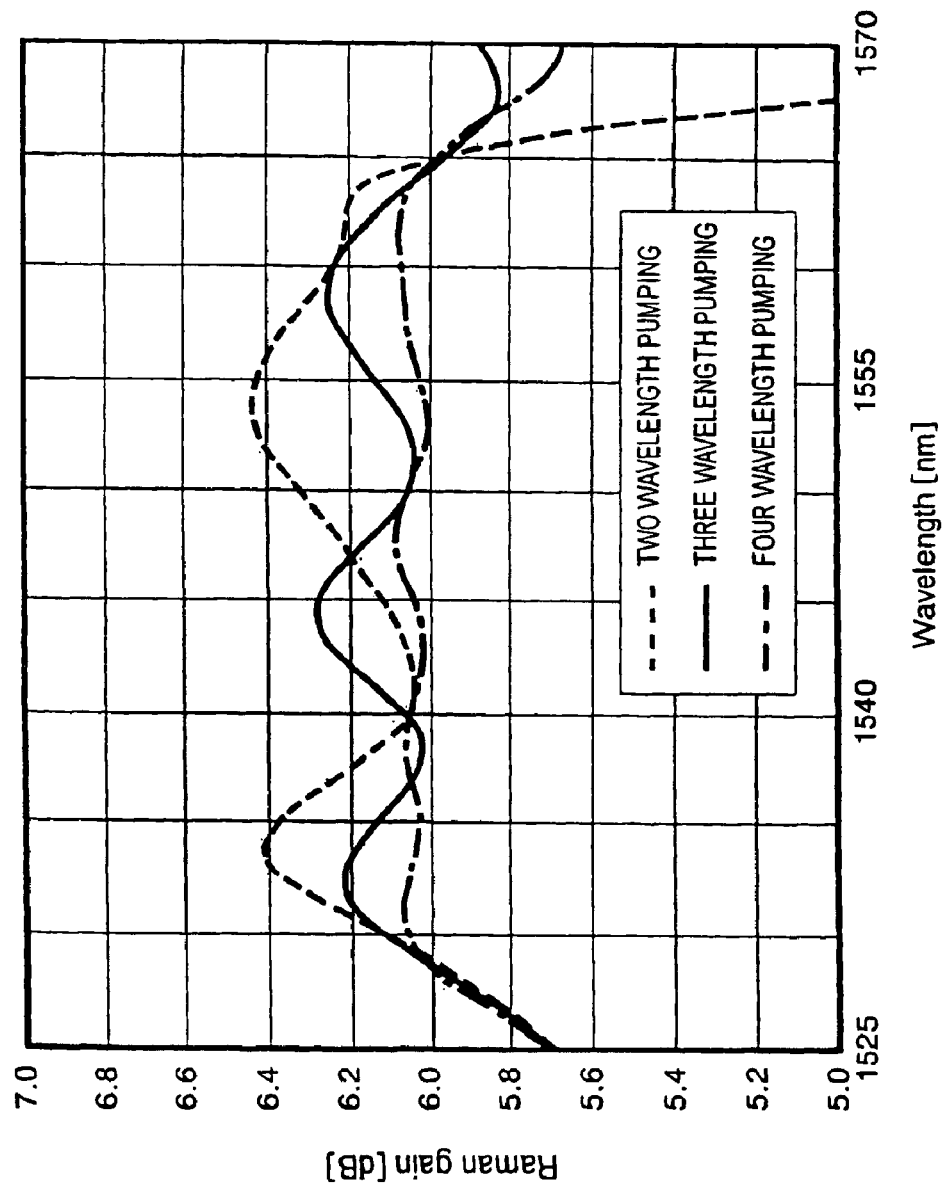
FIG. 26 is an explanatory view showing wave forms in an example that the Raman amplifying method of the present invention is applied to a C-band.
Figure 27:
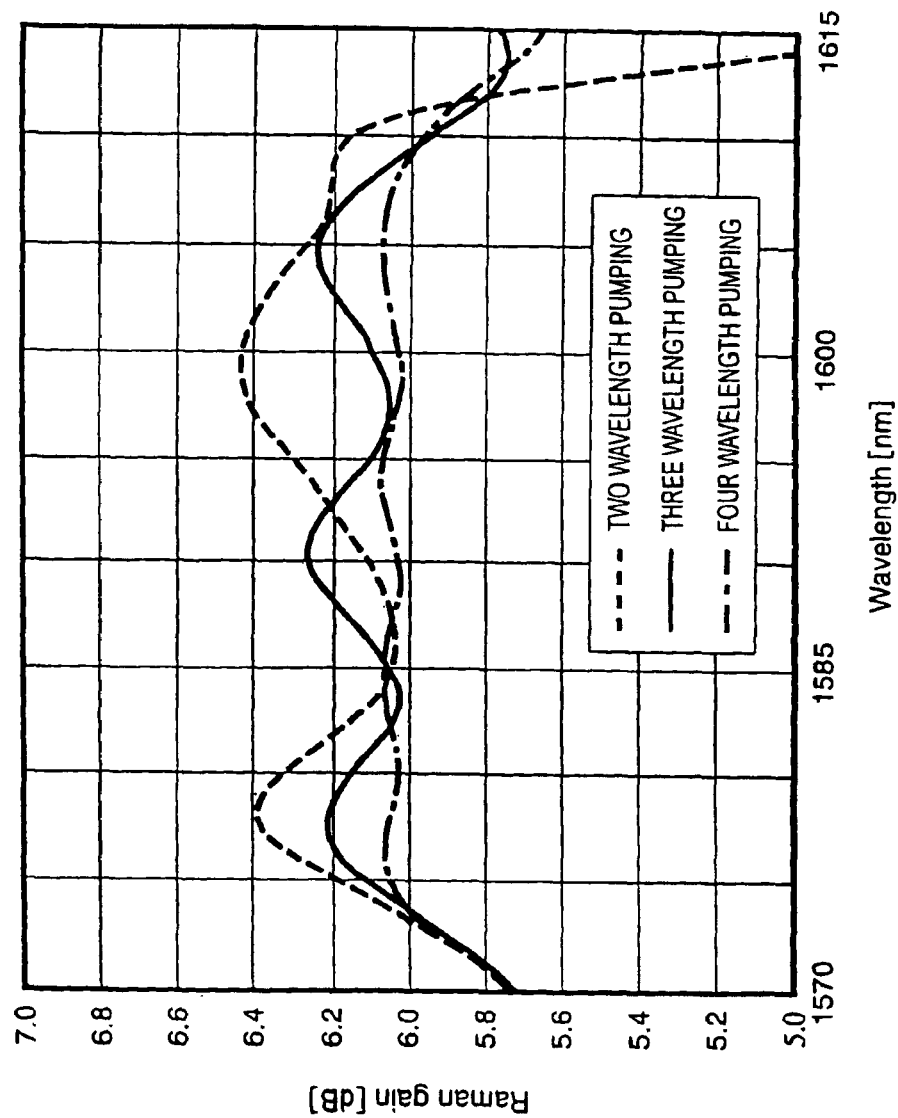
FIG. 27 is an explanatory view showing wave forms in an example that the Raman amplifying method of the present invention is applied to an L-band.
Figure 28:
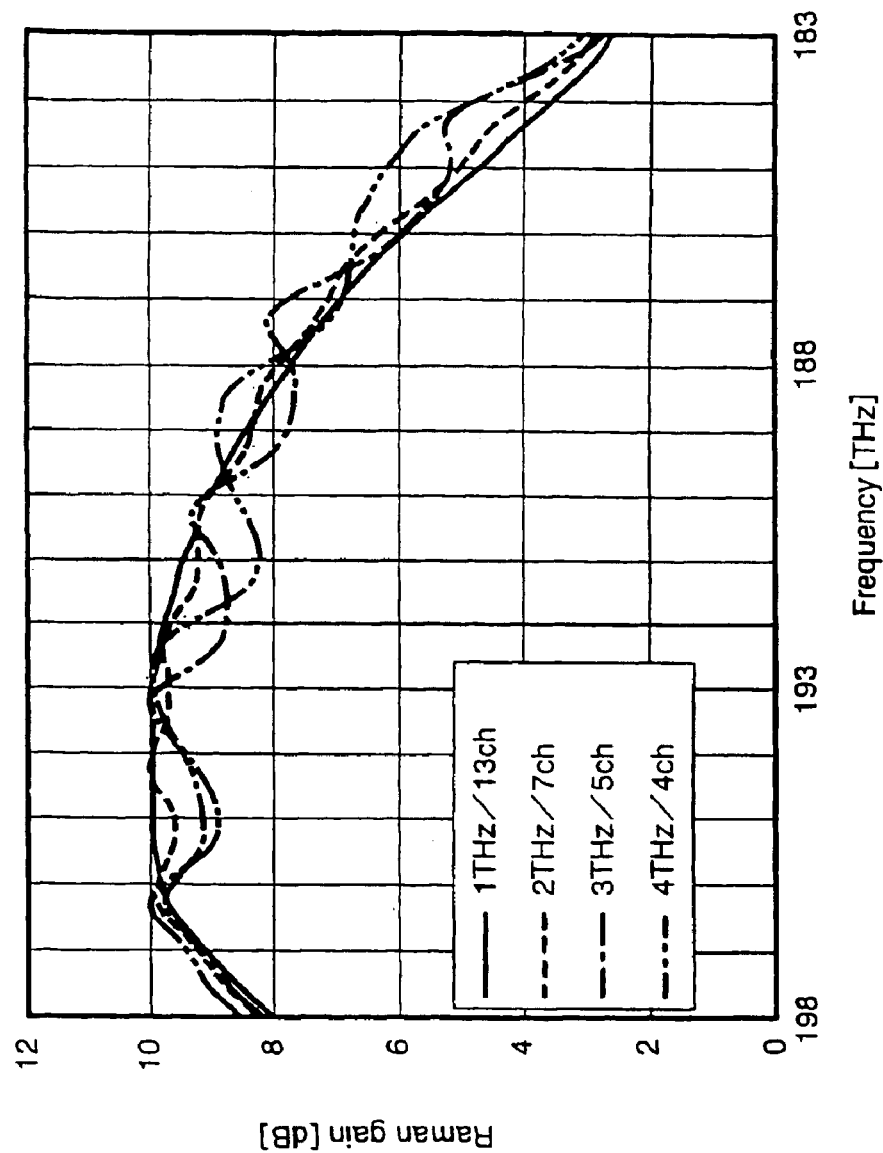
FIG. 28 is a view showing performance of Raman gain curves when the pump light intervals are equidistant and when the peak gain is adjusted to be 10 dB under a condition that gains generated by respective pump lights are the same.
Figure 29:
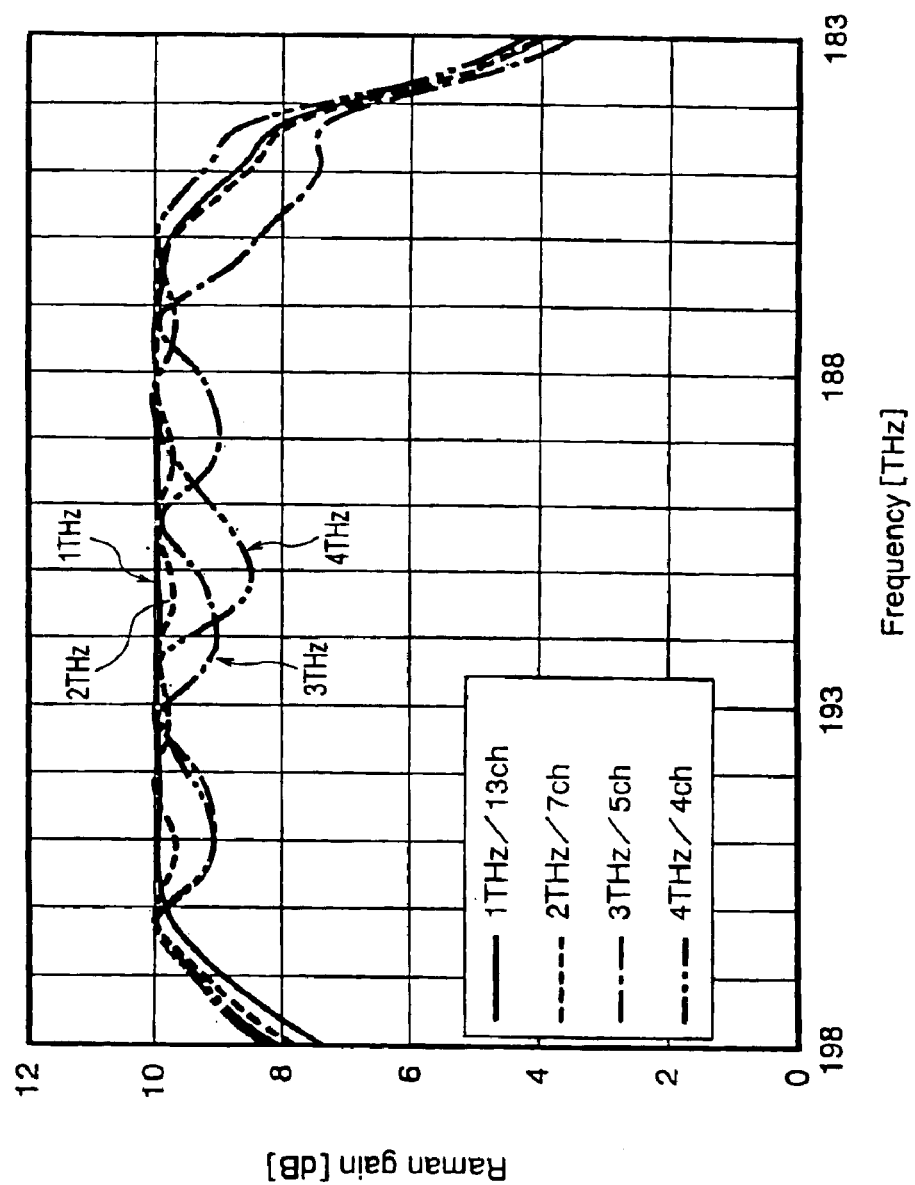
FIG. 29 is a view showing performance of Raman gain curves when the pump light intervals are equidistant and when gains of respective pump lights are adjusted to flatten the gains.
Figure 30:
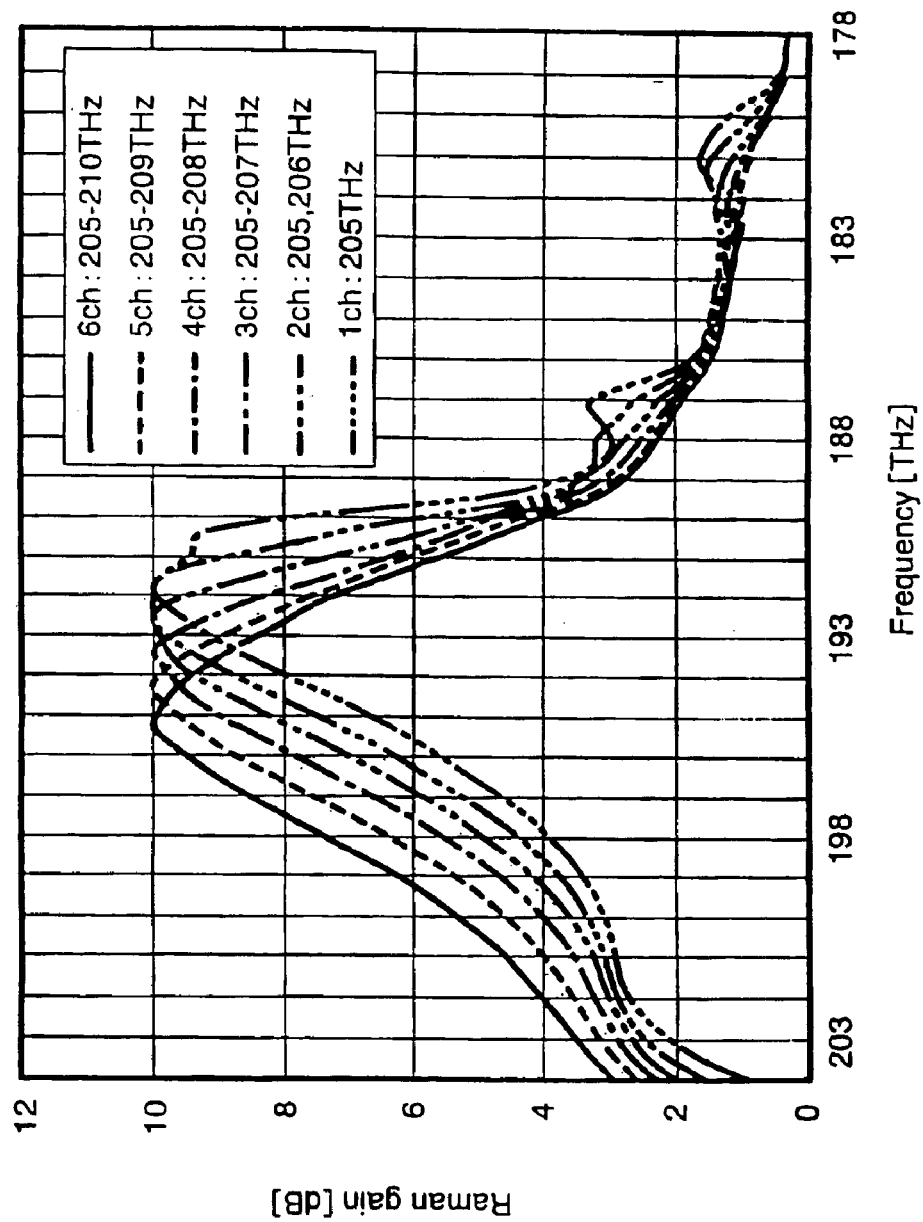
FIG. 30 is a view showing performance of Raman gain curves when the pump light intervals are equidistant and when the multiplexing number is changed with pump light interval of 1 THz.
Figure 31:
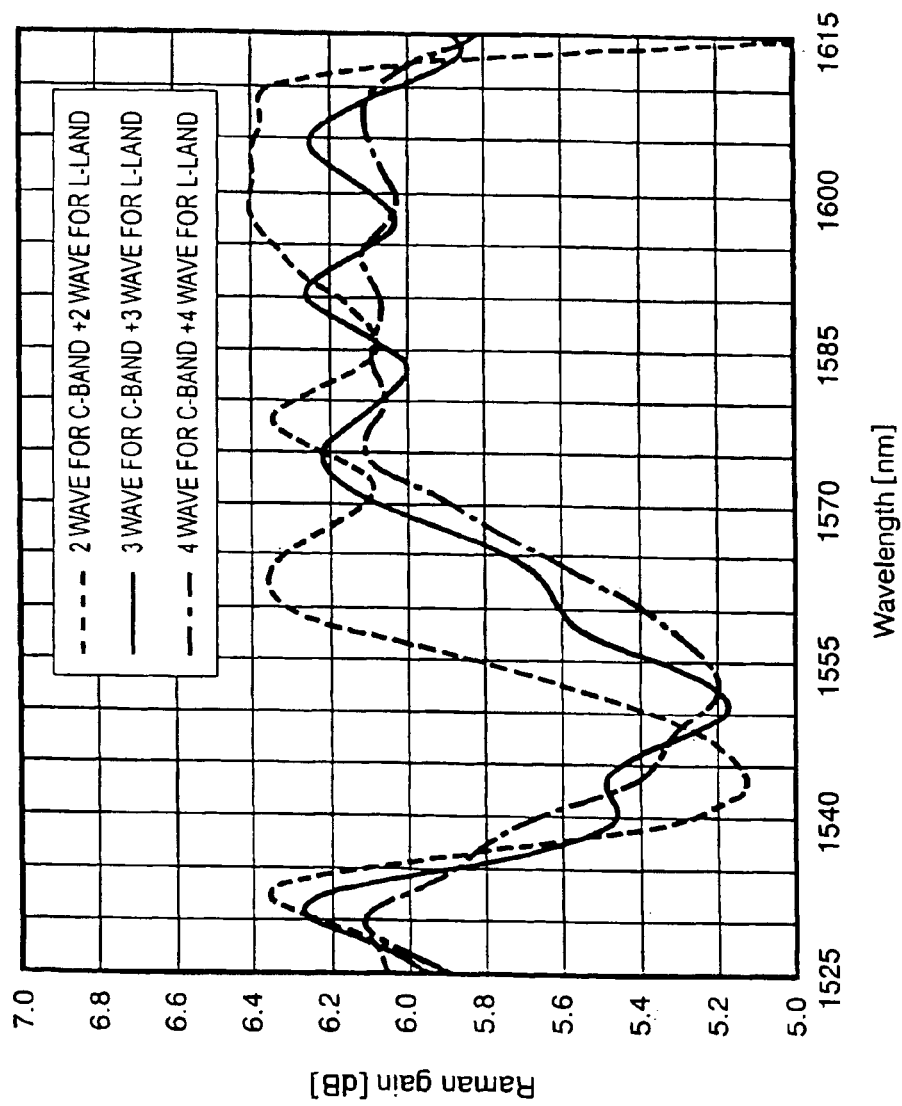
FIG. 31 is an explanatory view showing gain properties obtained when the Raman amplifying method of the present invention is applied to a C+L band.

FIG. 19 shows an example that the pump light has four wavelengths before expansion, and there are pumping wavelengths before and after expansion, as shown in the following Table 8. By selecting two of pumping wavelenghts added for the expansion to 1445 nm and 1453 nm, at least one of the pump lights added for the expansion is located within the band of the pump lights (1423 nm to 1462 nm) before expansion. Due to the presence of such pump light, the expansion can be realized while maintaining the gain flatness. Incidentally, in this example, since the pumping wavelength of 1462 nm is used for respective independent designs for C band and L band, addition is not required for expansion.

TABLE 8

| Pumping wavelength [nm] | After expansion | Before expansion | Addition |
| --- | --- | --- | --- |
| 1423 | ○ | ○ | |
| 1430 | ○ | ○ | |
| 1438 | ○ | ○ | |
| 1445 | ○ | | ○ |
| 1453 | ○ | | ○ |
| 1462 | ○ | ○ | |
| 1470 | ○ | | ○ |
| 1478 | ○ | | ○ |
| 1501 | ○ | | ○ |

EXAMPLE 2

This example 2 shows an example that the pump light has two wavelenghts before expansion and the wavelength of the pump light before expansion is greater than that in the example 1. In this example, the gain band for the C band is designed to be 1535 nm to 1570 nm. The pumping wavelenghts before and after expansion are as shown in the Table 9. By selecting one of pumping wavelengths added for the expansion to 1444 nm, at least one the pump lights added for the expansion is located within the band of the pump lights (1430 nm to 1457 nm) before expansion. Due to the presence of such pump light, the expansion can be realized while maintaining the gain flatness.

TABLE 9

| Pumping wavelength [nm] | After expansion | Before expansion | Addition |
| --- | --- | --- | --- |
| 1430 | ○ | ○ | |
| 1444 | ○ | | ○ |
| 1457 | ○ | ○ | |
| 1464 | ○ | | ○ |
| 1493 | ○ | | ○ |

EXAMPLE 3

This example 3 shows an example that the pump light has two wavelengths before expansion and the wavelength of the pump light before expansion is smaller than that in the example 1. In this example, the gain band of the C band is designed to be 1525 nm to 1560 nm. The pumping wavelengths before and after expansion are as shown in the following Table 10. By selecting one of pumping wavelengths added for the expansion to 1438 nm, at least one of the pump lights added for the expansion is located within the band of the pump lights (1422 nm to 1450 nm) before expansion. Due to the presence of such pump light, the expansion can be realized while maintaining the gain flatness.

TABLE 10

| Pumping wavelength [nm] | After expansion | Before expansion | Addition |
| --- | --- | --- | --- |
| 1422 | ○ | ○ | |
| 1438 | ○ | | ○ |
| 1450 | ○ | ○ | |
| 1464 | ○ | | ○ |
| 1493 | ○ | | ○ |

INDUSTRIAL AVAILABLITY

According to a Raman amplifier specified in claim 1, in a Raman amplifier using three or more pumping wavelengths, when the pumping wavelengths are divided into the short wavelength side group and the long wavelength side group at the boundary of the pumping wavelength having the longest interval between the adjacent wavelengths, since the short wavelength side group includes two or more pumping wavelengths having intervals therebetween which are substantially equidistant and the long wavelength side group is constituted by two or less pumping wavelengths, the negative gain tilt having wide band and less unevenness is formed by the short wavelength side group and, by combining it with the positive gain tilt formed by the long wavelength side group, a Raman amplifier having a wide band and good gain flatness can be achieved.

In Raman amplifiers specified in claims 2 to 4, since an interval of the pumping wavelength of the short wavelength side group is about 1 THz, a Raman amplifier in which the gain deviation is about 0.1 dB with respect to the peak value of Raman gain of 10 dB can be realized.

In a Raman amplifier specified in claim 5, when there are provided two or more pumping wavelengths before gain band expansion, since two or more new pumping wavelengths differentiated from the pumping wavelengths used before expansion are added and at least one of the pumping wavelengths to be added is differentiated from the pumping wavelengths used before expansion and the added pumping wavelengths are positioned in bands of the pumping wavelengths used before expansion, the added bands are pumped to increase gains of such bands, thereby flattening the gain in a wide band and expanding the gain band.

In a Raman amplifier specified in claim 6, since at least one of the pumping wavelengths to be added is differentiated from the pumping wavelengths used before expansion and at least one of the differentiated pumping wavelengths is positioned in a band of an pumping wavelength having insufficient gain among bands of the pumping wavelengths used before expansion, the pumping wavelength insufficient band is pumped to increase gain of such a band, thereby flattening the gain in a wide band and expanding the gain band.

In a Raman amplifier specified in claim 1, since at least one of the pumping wavelengths to be added is differentiated from the pumping wavelengths used before expansion, and, by adding one or more such pumping wavelengths, since the pumping wavelengths within the bands of the pumping wavelengths before expansion are spaced apart from each other equidistantly or substantially equidistantly, the entire pumping wavelength bands are pumped, thereby flattening the gain in a wide band and expanding the gain band.

In a Raman amplifier specified in claim 2, when a C-band and an L-band are simultaneously amplified, since one or more pumping wavelength different from the pumping wavelengths for the C-band used before expansion is added to bands of the pumping wavelengths for the C-band, the added band in the C-band is pumped to increase gain of such a band, thereby flattening the gain in a wide band and expanding the gain band.

In a Raman amplifier specified in claim 3, when a C-band and an L-band are simultaneously amplified, since one or more pumping wavelength different from the pumping wavelengths for the C-band used before expansion is added to a band of a wavelength having insufficient gain among bands of the pumping wavelengths for the C-band, the pumping wavelength insufficient band in the C-band is pumped to increase gain of such a band, thereby flattening the gain in a wide band and expanding the gain band.

In a Raman amplifier specified in claim 4, when a C-band and an L-band are simultaneously amplified, since one or more pumping wavelength different from the pumping wavelengths for the C-band used before expansion is added to bands of the pumping wavelengths before expansion so that the pumping wavelengths within the bands of the pumping wavelengths for the C-band before expansion are spaced apart from each other equidistantly or substantially equidistantly, the entire pumping wavelength bands for the C-band are pumped, thereby flattening the gain in a wide band and expanding the gain band.

What is claimed is:

1. A Raman amplifier, comprising:
   a first pump source configured to provide pump light at a first central wavelength;
   a second pump source configured to provide pump light at a second central wavelength, light from said first pump source and said second pump source configured to produce a Raman gain having a predetermined amplification bandwidth in a gain medium;
   a third pump source configured to provide pump light at a third central wavelength that is between said first and second central wavelengths; and
   a fourth pump source configured to provide pump light at a fourth central wavelength, outside of a wavelength range defined by said first and second central wavelengths,
   wherein the predetermined amplification bandwidth is increased when pump lights from said third and fourth pump sources are applied to the gain medium.

2. A Raman amplifier, comprising:
   a first pump source configured to provide pump light at a first central wavelength;
   a second pump source configured to provide pump light at a second central wavelength, light from said first pump source and said second pump source being applied to a gain medium to produce a Raman gain having a predetermined gain deviation within a predetermined amplification bandwidth;
   a third pump source configured to provide pump light at a third central wavelength between said first and second central wavelengths; and
   a fourth pump source configured to produce pump light at a fourth central wavelength, outside of a wavelength range defined by said first and second central wavelengths,
   wherein an expanded amplification bandwidth is formed when pump light from the third and fourth pump sources is also applied to the gain medium while not substantially exceeding said predetermined gain deviation in said predetermined amplification bandwidth.

3. A Raman amplifier, comprising:
   a first pump source configured to provide pump light at a first central wavelength;
   a second pump source configured to provide pump light at a second central wavelength, light from said first pump source and said second pump source configured to produce a Raman gain having a predetermined amplification bandwidth in a gain medium;
   a third pump source configured to provide pump light at a third central wavelength between said first and second central wavelengths such that the first, second and third central wavelengths are substantially equidistant apart; and
   a fourth pump source configured to provide pump light at a fourth central wavelength, outside of a wavelength range defined by said first and second wavelengths,
   wherein the predetermined amplification bandwidth is increased when pump lights from said third and fourth pump sources are applied to the gain medium.

4. A Raman amplifier, comprising:
   a first pump source configured to provide pump light at a first central wavelength;
   a second pump source configured to provide pump light at a second central wavelength, light from said first pump source and said second pump source configured to produce a Raman gain at C-band in a gain medium;
   a third pump source configured to provide pump light to the gain medium at a third central wavelength;
   a fourth pump source configured to provide a pump light to the gain medium at a fourth central wavelength, light from said third pump source and said fourth pump source configured to produce Raman gain at L-band in the gain medium; and
   a fifth pump source configured to provide pump light at a central wavelength that is between the first and second central wavelengths,
   wherein the C-band and the L-band are simultaneously amplified in the gain medium.

5. A Raman amplifier, comprising:
   a first pump source configured to provide pump light at a first central wavelength;
   a second pump source configured to provide pump light at a second central wavelength, light from said first pump source and said second pump source configured to produce a Raman gain having a predetermined gain deviation within C-band;
   a third pump source configured to provide pump light to the gain medium at a third central wavelength;
   a fourth pump source configured to provide a pump light to the gain medium at a fourth central wavelength, light from said third pump source and said fourth pump source configured to produce a Raman gain at L-band in the gain medium; and
   a fifth pump source configured to provide pump light to the gain medium at a fifth central wavelength that is between the first and second central wavelengths,
   wherein the C-band and L-band are simultaneously amplified and an expanded amplification bandwidth is formed when pump light from the third, fourth and fifth pump sources is also applied to the gain medium while not substantially exceeding said predetermined gain deviation in the C-band.

6. A Raman amplifier, comprising:
   a first pump source configured to provide pump light to a gain medium at a first central wavelength;

a second pump source configured to provide pump light to the gain medium at a second central wavelength, light from said first pump source and said second pump source configured to produce a Raman gain at C-band in the gain medium;

a third pump source configured to provide pump light to the gain medium at a third central wavelength;

a fourth pump source configured to provide a pump light to the gain medium at a fourth central wavelength, light from said third pump source and said fourth pump source configured to produce a Raman gain in the gain medium at L-band; and a fifth pump light configured to provide pump light to the gain medium at a fifth central wavelength that is between the first and second central wavelengths such that the first, second and fifth central wavelengths are substantially equidistant apart in wavelength, wherein the C-band and L-band are simultaneously amplified in the gain medium.

* * * * *